US009367185B2

(12) United States Patent
Sasselli et al.

(10) Patent No.: US 9,367,185 B2
(45) Date of Patent: Jun. 14, 2016

(54) METHOD AND SYSTEM FOR DISCRIMINATING STYLUS AND TOUCH INTERACTIONS

(71) Applicant: Logitech Europe S.A., Lausanne (CH)

(72) Inventors: Nicolas Sasselli, Belmont-sur-Lausanne (CH); Patrick Salamin, Sion (CH); Maxim Vlasov, Geneva (CH); Julien Racle, Préverenges (CH); Rémy Zimmermann, Pully (CH); Jiri Holzbecher, Binningen (CH)

(73) Assignee: LOGITECH EUROPE S.A., Lausanne (CH)

(*) Notice: Subject to any disclaimer, the term of this patent is extended or adjusted under 35 U.S.C. 154(b) by 200 days.

(21) Appl. No.: 14/014,274

(22) Filed: Aug. 29, 2013

(65) Prior Publication Data
US 2014/0168116 A1  Jun. 19, 2014

Related U.S. Application Data

(60) Provisional application No. 61/755,881, filed on Jan. 23, 2013, provisional application No. 61/791,577, filed on Mar. 15, 2013, provisional application No. 61/738,797, filed on Dec. 18, 2012, provisional application No. 61/762,222, filed on Feb. 7, 2013, provisional application No. 61/790,310, filed on Mar. 15, 2013.

(51) Int. Cl.
*G06F 3/041* (2006.01)
*G06F 3/044* (2006.01)
*G06F 3/0354* (2013.01)

(52) U.S. Cl.
CPC ............ *G06F 3/044* (2013.01); *G06F 3/03545* (2013.01); *G06F 3/0416* (2013.01)

(58) Field of Classification Search
CPC ... G06F 3/0488; G06F 3/041; G06F 3/04883; G06F 3/04842; G06F 3/044; G06F 2203/04104; G06F 1/169; G06F 2203/04106; G06F 3/016; G06F 3/0412; G06F 3/03545; G06F 1/1626; G06F 21/31; G06F 2203/04101; G06F 2203/04808; G06F 3/03542; G06F 3/03547; H04N 2005/4408; H04N 21/42224
USPC ................................................ 345/173–183
See application file for complete search history.

(56) References Cited

U.S. PATENT DOCUMENTS 4,476,463 A   10/1984   Ng et al.
4,677,428 A   6/1987    Bartholow
(Continued)

FOREIGN PATENT DOCUMENTS

EP   0464908 A2   1/1992
EP   0572182 A1   12/1993
(Continued)

OTHER PUBLICATIONS

Wayne Westerman, "Hand Tracking, Finger Identification, and Chordic Manipuation of a Multi-Touch Surface", 1999.
(Continued)

*Primary Examiner* — Amare Mengistu
*Assistant Examiner* — Gloryvid Figueroa-Gibson
(74) *Attorney, Agent, or Firm* — Patterson & Sheridan LLP.

(57) ABSTRACT

Embodiments of the invention are directed to control devices, such as human interface devices, configured for use with a tablet computer. More specifically, the present invention relates to methods and system for discriminating between the interactions of a handheld device, touch of one or more of the user's finger(s) and interaction with appendages of the user on a touch-screen tablet computer. The methods described herein may include discriminating between the interaction of the handheld device, the user's finger(s) and an appendage of the user so that the collected information can be used to control some aspect of the hardware or software running on the touch-screen tablet computer.

21 Claims, 16 Drawing Sheets

(56) References Cited

U.S. PATENT DOCUMENTS

| | | | |
|---|---|---|---|
| 4,705,942 A | 11/1987 | Budrikis et al. | |
| 4,785,564 A | 11/1988 | Gurtler | |
| 4,794,634 A | 12/1988 | Torihata et al. | |
| 5,117,071 A | 5/1992 | Greanias et al. | |
| 5,404,458 A * | 4/1995 | Zetts | G06F 3/04883 345/173 |
| 5,488,204 A | 1/1996 | Mead et al. | |
| 5,568,292 A | 10/1996 | Kim | |
| 5,610,629 A | 3/1997 | Baur | |
| 5,659,332 A | 8/1997 | Ishii et al. | |
| 5,677,744 A | 10/1997 | Yoneda et al. | |
| 5,880,411 A | 3/1999 | Gillespie et al. | |
| 5,914,708 A | 6/1999 | LaGrange et al. | |
| 5,959,617 A | 9/1999 | Bird et al. | |
| 6,002,387 A | 12/1999 | Ronkka et al. | |
| 6,100,538 A | 8/2000 | Ogawa | |
| 6,133,906 A | 10/2000 | Geaghan | |
| 6,188,391 B1 | 2/2001 | Seely et al. | |
| 6,323,846 B1 | 11/2001 | Westerman et al. | |
| 6,441,362 B1 | 8/2002 | Ogawa | |
| 6,504,530 B1 | 1/2003 | Wilson et al. | |
| 6,529,189 B1 | 3/2003 | Colgan et al. | |
| 6,597,348 B1 | 7/2003 | Yamazaki et al. | |
| 6,603,867 B1 | 8/2003 | Sugino et al. | |
| 6,667,740 B2 | 12/2003 | Ely et al. | |
| 6,681,034 B1 | 1/2004 | Russo | |
| 6,803,906 B1 | 10/2004 | Morrison et al. | |
| 7,015,894 B2 | 3/2006 | Morohoshi | |
| 7,084,933 B2 | 8/2006 | Oh et al. | |
| 7,098,894 B2 | 8/2006 | Yang et al. | |
| 7,372,455 B2 | 5/2008 | Perski et al. | |
| 7,612,767 B1 | 11/2009 | Griffin et al. | |
| 7,649,527 B2 | 1/2010 | Cho et al. | |
| 7,663,607 B2 | 2/2010 | Hotelling et al. | |
| 8,094,133 B2 | 1/2012 | Sato et al. | |
| 8,134,542 B2 | 3/2012 | Hagen et al. | |
| 8,243,041 B2 | 8/2012 | Westerman | |
| 8,243,049 B2 | 8/2012 | Vos | |
| 8,278,571 B2 | 10/2012 | Orsley | |
| 2002/0175903 A1 | 11/2002 | Fahraeus et al. | |
| 2003/0214481 A1* | 11/2003 | Xiong | G06F 3/017 345/157 |
| 2004/0008189 A1 | 1/2004 | Clapper et al. | |
| 2004/0095333 A1 | 5/2004 | Morag et al. | |
| 2004/0105040 A1 | 6/2004 | Oh et al. | |
| 2005/0128191 A1 | 6/2005 | Katsurahira et al. | |
| 2006/0026521 A1 | 2/2006 | Hotelling et al. | |
| 2006/0250381 A1 | 11/2006 | Geaghan | |
| 2007/0030258 A1 | 2/2007 | Pittel et al. | |
| 2008/0044077 A1* | 2/2008 | Mennie | G06K 9/033 382/135 |
| 2008/0128180 A1 | 6/2008 | Perski et al. | |
| 2008/0150658 A1 | 6/2008 | Vos | |
| 2008/0150918 A1 | 6/2008 | Hagen et al. | |
| 2008/0297487 A1 | 12/2008 | Hotelling et al. | |
| 2008/0309625 A1 | 12/2008 | Krah et al. | |
| 2009/0262637 A1 | 10/2009 | Badaye et al. | |
| 2010/0013796 A1 | 1/2010 | Abileah et al. | |
| 2010/0020037 A1 | 1/2010 | Narita et al. | |
| 2010/0051356 A1 | 3/2010 | Stern et al. | |
| 2010/0095205 A1* | 4/2010 | Kinoshita | G06F 3/0416 715/702 |
| 2010/0141589 A1* | 6/2010 | Hoover | 345/173 |
| 2010/0252335 A1 | 10/2010 | Orsley | |
| 2010/0289754 A1 | 11/2010 | Sleeman et al. | |
| 2010/0315384 A1 | 12/2010 | Hargreaves et al. | |
| 2011/0043489 A1 | 2/2011 | Yoshimoto et al. | |
| 2011/0115741 A1* | 5/2011 | Lukas | G06F 21/32 345/174 |
| 2012/0013565 A1 | 1/2012 | Westhues et al. | |
| 2012/0050207 A1 | 3/2012 | Westhues et al. | |
| 2012/0050231 A1 | 3/2012 | Westhues et al. | |
| 2012/0068964 A1 | 3/2012 | Wright et al. | |
| 2012/0177567 A1 | 7/2012 | Wayne et al. | |
| 2012/0177571 A1 | 7/2012 | Watanabe et al. | |
| 2012/0177573 A1 | 7/2012 | Wang et al. | |
| 2012/0206330 A1 | 8/2012 | Cao et al. | |
| 2012/0262407 A1* | 10/2012 | Hinckley | G06F 3/038 345/173 |
| 2012/0327041 A1 | 12/2012 | Harley et al. | |
| 2012/0327042 A1 | 12/2012 | Harley et al. | |
| 2013/0002606 A1 | 1/2013 | Mann | |
| 2013/0106722 A1* | 5/2013 | Shahparnia | G06F 3/03545 345/173 |
| 2013/0300696 A1* | 11/2013 | Haran | G06F 3/041 345/173 |
| 2014/0118308 A1* | 5/2014 | Rhee | G06F 3/0383 345/177 |

FOREIGN PATENT DOCUMENTS

| | | |
|---|---|---|
| EP | 0618527 A1 | 10/1994 |
| EP | 0712090 A1 | 5/1996 |
| EP | 0 762 319 A2 | 3/1997 |
| EP | 0962881 A2 | 12/1999 |
| JP | 2000-163031 A | 6/2000 |
| WO | 97/40488 A1 | 10/1997 |
| WO | 99/22338 A1 | 5/1999 |
| WO | 2012/177571 A1 | 12/2012 |
| WO | 2012177567 A1 | 12/2012 |
| WO | 2012177573 A2 | 12/2012 |
| WO | 2013165466 A1 | 11/2013 |

OTHER PUBLICATIONS

Dean Harris Rubine, "The Automatic Recognition of Gestures", 1991.

Office Action, U.S. Appl. No. 12/327,813 dated Aug. 23, 2011.

* cited by examiner

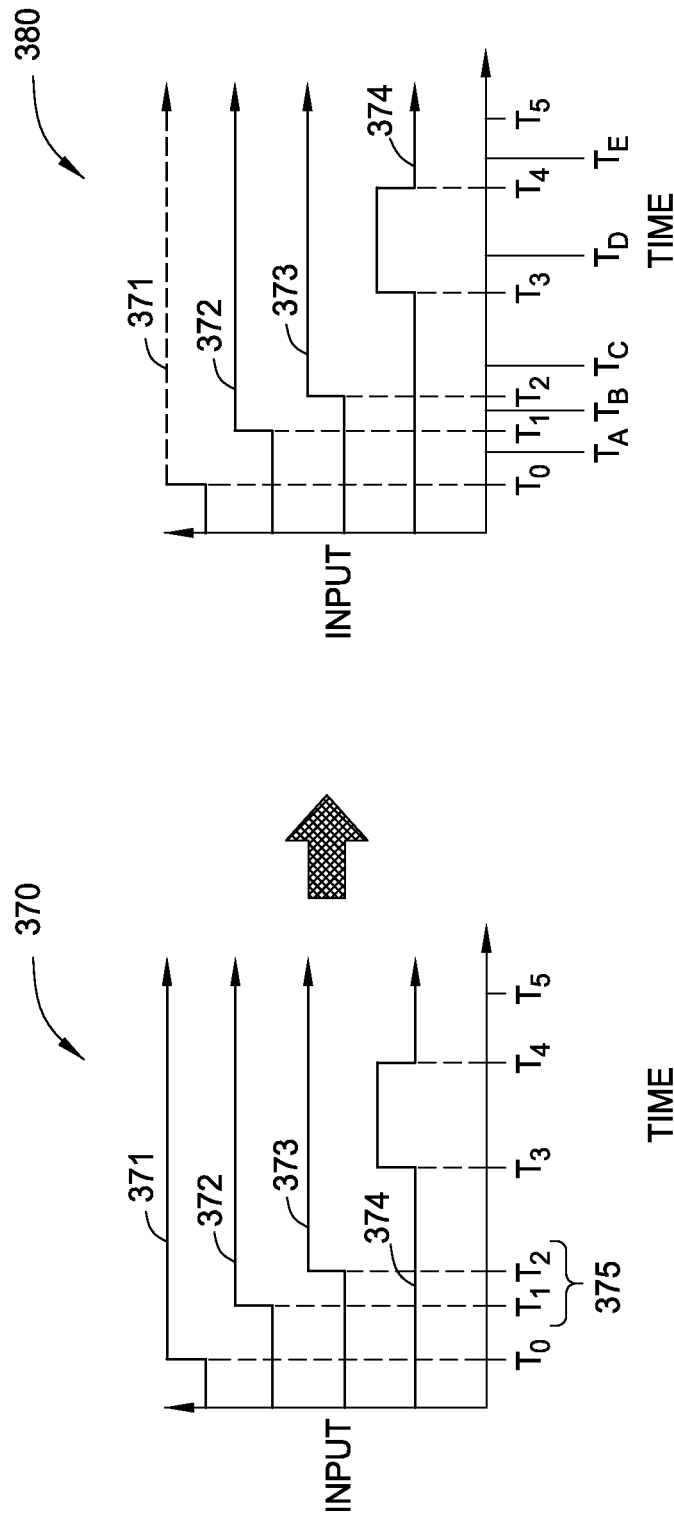

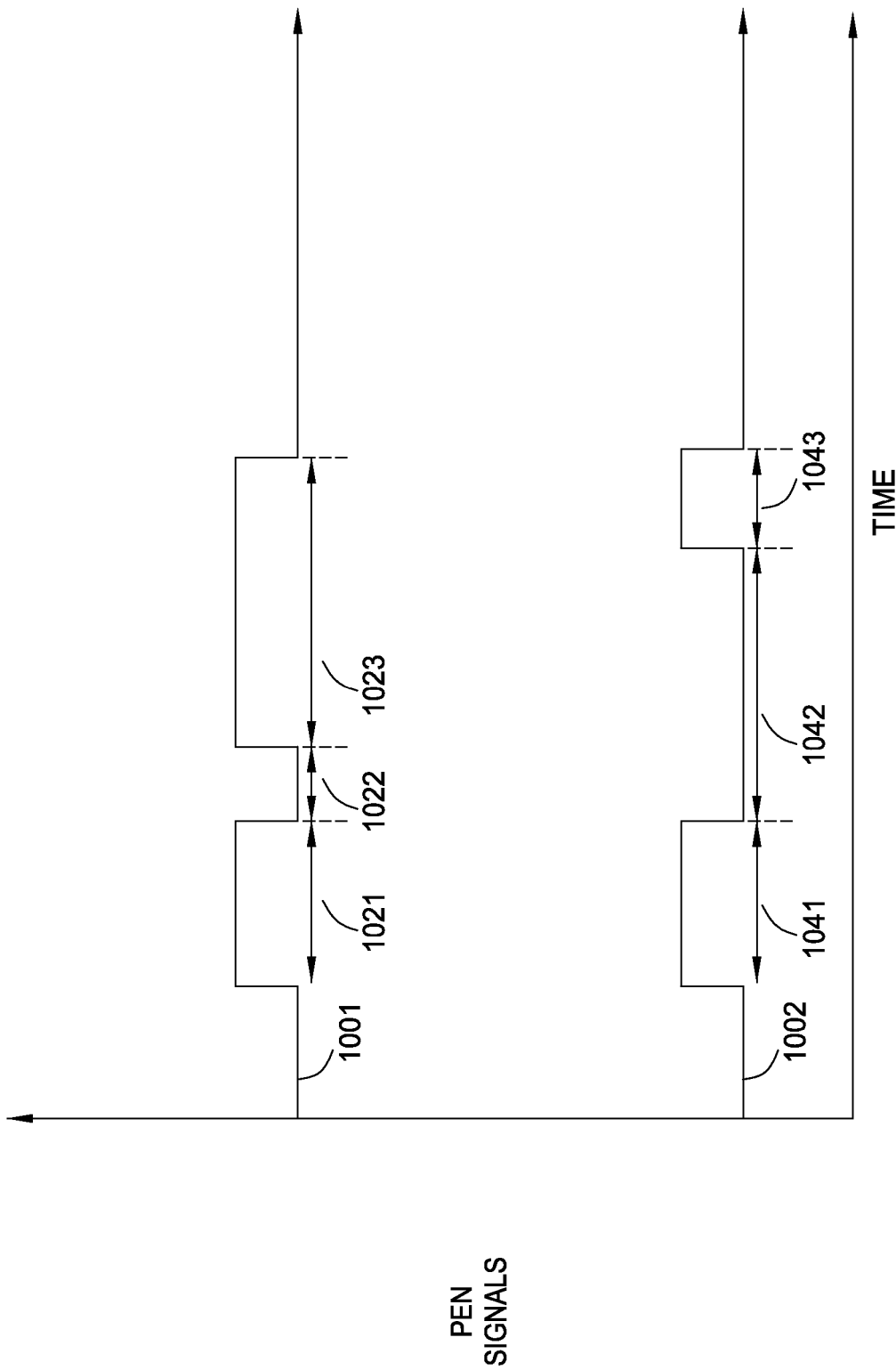

METHOD AND SYSTEM FOR DISCRIMINATING STYLUS AND TOUCH INTERACTIONS

CROSS-REFERENCE TO RELATED APPLICATIONS

This application claims benefit of U.S. Provisional Patent Application Ser. No. 61/755,881, filed Jan. 23, 2013, entitled "Method and System For Discriminating Pen and Touch Interactions", U.S. Provisional Patent Application Ser. No. 61/791,577, filed Mar. 15, 2013, entitled "Method and System for Discriminating Stylus and Touch Interactions", U.S. Provisional Patent Application Ser. No. 61/738,797, filed Dec. 18, 2012 entitled "Electronically Augmented Pen Tip For A Touch Pad Digitizer", U.S. Provisional Patent Application Ser. No. 61/762,222, filed Feb. 7, 2013, entitled "Electronically Augmented Pen Tip For A Touch Pad Digitizer" and U.S. Provisional Patent Application Ser. No. 61/790,310, filed Mar. 15, 2013, entitled "Active Stylus For Touch Sensing Applications", which are all hereby incorporated herein by reference.

BACKGROUND OF THE INVENTION

1. Field of the Invention

The present invention relates to a method and a system that is able to discriminate between the interaction of an electronic stylus pen, finger(s) or user's appendage and a touch screen containing device.

2. Description of the Related Art

Touch-screen tablet computers allow a user the ability to interact directly with content displayed on the touch-screen of the tablet computer. These interactions can be conducted through various means, but typically is done through touch, by way of the user's fingers directly interacting with the screen, or through the use of a stylus pen or other type of input control device that contacts the screen based on movements made by the user. Typically, touch-screens distinguish touch inputs from stylus pen inputs by using various sensing technologies or input modes that the user has to select based on the operations the user wants to conduct on the touch-screen of the tablet computer. Other typical solutions require stylus pen inputs to originate from a stylus pen that is physically tethered to the tablet computer.

Collecting touch information from these types of interface mechanisms also introduces a number of challenges. Moreover, the process of reliably collecting touch information becomes increasingly more complicated where the computing device allows a user to input information using both a touch input mechanism and a stylus pen input mechanism. In the course of interfacing with the touch sensitive surface of the computing device with a stylus pen device, the user may inadvertently rest his or her palm on the touch sensitive surface. The computing device may then incorrectly interpret this inadvertent contact as a legitimate input activity. A similar challenge may confront a user who is intentionally using a touch input mechanism to control or input data to the computing device. In some cases, the user may attempt to apply a focused touch to the surface of the computing device, yet the user may accidentally brush or bump his or her hand against other parts of the display surface, causing accidental input events. These problems may understandably frustrate the user if they become a frequent occurrence, or even if uncommon, if they cause significant disruption in the task that the user is performing.

Moreover, due to limitation in the computing power of the computing device, a wish to increase the speed of the computing device by reducing the computational power required to collect and transfer the touch interaction data and/or the often limited nature of the data received from the touch sensing components of a third party's computing device on which a hardware and software application (e.g., "app") maker's software is running, there is a need for a method that can distinguish between the different user inputs by use of a simplified data set that is created by the computing device from the interaction of the user's fingers, appendage and/or stylus pen. In some cases, the simplified data set includes the coordinates of a touch point and the time when the touch point was sensed by the touch sensing components. The simplified data set is generally a small fraction of the amount of the data that is commonly available from the touch sensitive hardware in a conventional touch sensitive display type computing devices today.

Despite the progress made with respect to operating touch screen tablet computers, there is a need in the art for improved methods and systems related to distinguishing different inputs provided to tablet computers in spite of the problems discussed above.

SUMMARY OF THE INVENTION

Embodiments relate generally to control devices, such as human interface devices, configured for use with a touch screen tablet computer. More specifically, the present invention relates to methods and systems for discriminating between the interactions of a handheld device, touch of one or more of the user's finger(s) and interaction with appendages of the user on a touch-screen tablet computer. The methods described herein may include discriminating between the interaction of the handheld device, such as an electronic stylus pen, the user's finger(s) and a user's appendage so that the collected information can be used to control some aspect of the hardware or software running on the touch-screen tablet computer. The methods disclosed herein may also be used to separate the interaction of the user's appendage from the interactions of the handheld device and/or user's finger(s) with the touch-screen tablet computer. In one example, the information received from the appendage of the user is distinguished from the information received from the interaction of a stylus pen and the user's finger and the touch-screen tablet computer, and is purposely not used to control the hardware and/or software running on the touch-screen tablet computer.

Embodiments provide a method of operating a host device, comprising receiving, at the host device, information related to a touch-down event, receiving, at the host device, information related to a touch event from a controlling engine, correlating the information related to the touch-down event with the information related to the touch event, and determining that the touch-down event is associated with a handheld device.

Embodiments further provide a method of characterizing user input data received by a host device, comprising receiving, at the host device, information related to a first touch event from a touch sensing unit coupled to the host device, wherein the information from the first touch event comprises a first touch data point, comparing the first touch event information with a first rule and a second rule, wherein the first rule and the second rule each form a vote as to the type user input that created the first touch event, and attributing the first touch data point to a type of user input by analyzing the votes received from the first and second rule. However, in some embodiments, more than two rules may be used to determine the type of user input.

Embodiments may further provide a method of characterizing user input data received by a host device, comprising receiving, at the host device, information related to a touch-down event from a handheld device, wherein the information related to the touch-down event comprises information relating to a first time when the touch-down event occurred, receiving, at the host device, information related to a first touch event and a second touch event from a touch sensing unit coupled to the host device, wherein the information provided for the first touch event comprises a first touch data point and information relating to a second time, and the information provided for the second touch event comprises a second touch data point and information relating to a third time, analyzing the information received by the host device, comprising comparing a predetermined threshold time and the information relating to the first time and the second time, and then assigning a first user input type vote to the first touch data point based on the comparison, and comparing a first position of the first touch data point on a user interface of the host device and a second position of the second touch data point on the user interface of the host device, and then assigning a second user input type vote to the first touch data point based on the comparison of the first position relative to the second position, and attributing a type of user input to the first touch data point using the first user input type vote and second user input type vote.

Embodiments further provide a method of characterizing user input data received by a host device, comprising receiving, at the host device, information related to a touch-down event from a handheld device, wherein the information comprises information relating to a first time when the touch-down event occurred, receiving, at the host device, information related to a first touch event from a touch sensing unit coupled to the host device, wherein the information comprises information relating to a second time when the touch event occurred on a touch sensitive unit of the host device, correlating the information related to the touch-down event with the information related to the first touch event, wherein correlating the information comprises comparing the first time, the second time and a predetermined threshold, and determining that the touch-down event is associated with the handheld device when the difference in time between the first and second time is less than the predetermined threshold.

Embodiments further provide a method of characterizing user input data received by a host device, comprising receiving, at the host device, information related to a touch-down event from a handheld device, receiving, at the host device, information related to a plurality of touch events from a touch sensing unit coupled to the host device, defining a portion of the plurality of touch events as being part of a first cluster of touch events, correlating the information related to the touch-down event with the information related to the first cluster of touch events, determining that the first cluster of touch events is associated with a user's appendage, and determining that at least one touch event of the plurality of touch events is associated with a handheld device, wherein the at least one touch event is not within the first cluster.

Embodiments further provide a computer readable medium configured to store instructions executable by a processor of a host device to characterize user input data received by the host device, the instructions when executed by the processor causing the processor to receive information related to a first touch event from a touch sensing unit coupled to the host device, wherein the information from the first touch event comprises a first touch data point, compare the first touch event information with a first rule and a second rule, wherein the first rule and the second rule each form a vote as to the type user input that created the first touch event; and attribute the first touch data point to a type of user input by analyzing the votes received from the first and second rule.

Embodiments further provide a method of operating a host device, comprising receiving, at the host device, information related to a touch-down event, receiving, at the host device, information related to a plurality of touch events from a controller, determining one or more clusters of touch events from the plurality of touch events, correlating the information related to the touch-down event with the information related to the one or more cluster of touch events, determining that one of the one or more the cluster of touch events is associated with a palm, and determining that the touch-down event is associated with a handheld device.

In another embodiment, the handheld device includes at least one of an accelerometer, a magnetometer, a gyroscope, or the like for detecting the orientation of the handheld device and detecting a triggering event, which both can be used to help control some aspect of the hardware or software running on the touch-screen tablet computer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3C is a simplified signal diagram illustrating aspects of the process of discriminating stylus pen interactions from touch interactions on a touch-screen, according to an embodiment of the invention.

FIG. 3D is a simplified signal diagram illustrating aspects of the process of discriminating stylus pen interactions from touch interactions on a touch-screen, according to an embodiment of the invention.

FIG. 10 illustrates simplified signature pulse diagrams that may be generated by two pens, according to an embodiment of the invention.

Figure 1:
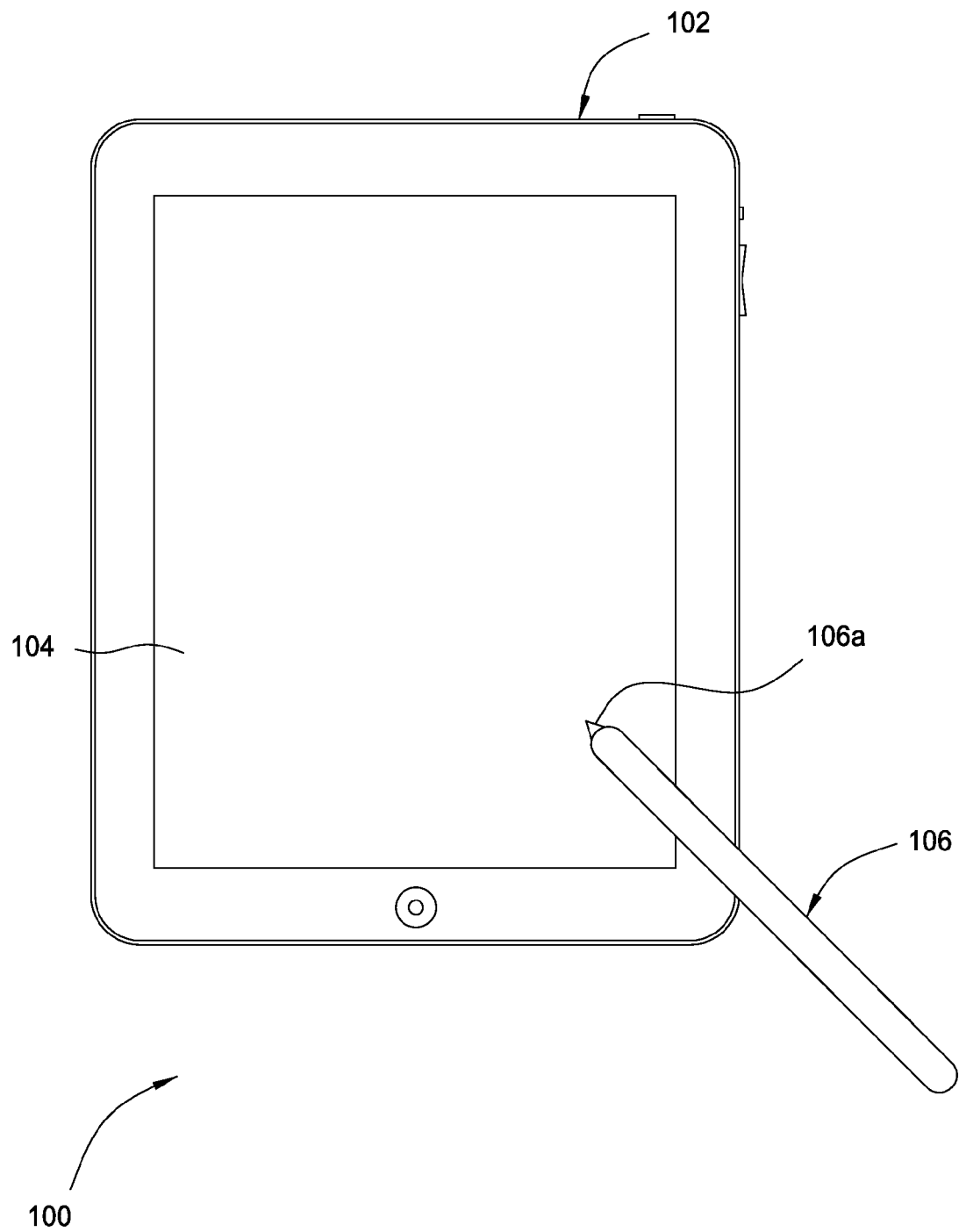
FIG. 1 illustrates an exemplary touch-screen tablet computer and a capacitive stylus pen according to an embodiment of the invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Embodiments of the present invention generally provide a system and methods of distinguishing between the different types of user inputs provided from the interaction of a user's finger, a user's appendage and/or a handheld device with a touch sensitive device. In some configurations the handheld device is an electronic stylus pen, or also referred to herein as simply a "stylus pen," that a user uses to provide input to control some aspect of the touch sensitive device. Computing devices that provide software applications that allow a user to input information via a touch input mechanism and a stylus pen input mechanism are often complex due to the need to distinguish between the interaction of a user's finger, user's appendage and stylus pen with the touch sensitive device to properly control some aspect of the hardware or software applications running on the computing device. It is common for the software applications running on the computing device to assign different tasks or cause different computing device controlling events to happen based on the input received from either a stylus pen, a finger or an appendage. It is often desirable to single out the unwanted interactions with the touch sensitive device, such as interactions created by an appendage of a user (e.g., palm, shirt cuff, or other similar element), so that they can be purposely excluded from the input provided to and/or analyzed by one or more software applications running on the computing device. Errors in the proper selection of an inputting element will create errors in the output generated by the software running on the host device, which will understandably frustrate the user even if they are an uncommon occurrence. Moreover, improper selection errors can also cause significant disruption to the task that the user is performing on the computing device.

Embodiments of the invention described herein may also include a system and methods that employ a controlling engine running on a touch sensitive computing device, generally referred to herein as a host device, to discern between the user input received from a stylus pen, fingers or user's appendage. The data generated from the controlling engine's analysis of the user input data received from the various components that are coupled to or in communication with the touch sensitive computing device can then be used to control some aspects of the hardware or software running on the touch sensitive computing device. The controlling engine generally includes software instructions that include one or more input discrimination techniques that are used to analyze the various types of user input data received from one or more components in the touch sensitive device to determine the likely source of the user input. The one or more input discrimination techniques may include time based synchronization techniques, geometric shape discrimination techniques and inference based discrimination techniques that can be used separately or in combination to discern between different types of inputs received by the touch sensitive computing device. Touch sensitive computing devices may include a touch-screen tablet computer, which may use a resistive, capacitive, acoustic or other similar sensing technique to sense the input received from a user.

In some embodiments, a system and method are used to distinguish between different types of user inputs using a simplified data set that is created by the touch sensitive computing device from the interaction of a user's finger, user's appendage and/or a handheld device. In some cases, the simplified data only includes the coordinates of the touch point and the time that the interaction occurred with the touch sensing components, which is generally a small fraction of the amount of the data that is typically collected by conventional handheld or touch sensitive computing devices.

In FIG. 1, a system is depicted that includes a touch sensitive computing device, or host device 102, that includes a user interface 104. Host devices 102 that include a user interface 104 capable of user interaction through a touch-screen sensing component. The host device 102 may be, for example, general computing devices, phones, media players, e-reader, kiosks, notebooks, netbooks, tablet types of computers, or any other device having one or more touch-sensitive inputs. In some devices, the user interface 104 can include components that are used to display applications being executed by the host device 102. In the example shown in FIG. 1, the host device 102 is an electronic device such as an iPad® device from Apple Inc. Exemplary embodiments of computing devices include, without limitation, the iPhone®, iPad® and iPod Touch® devices from Apple Inc., the Galaxy Note® 10.1 from Samsung, the Surface™ from Microsoft, other mobile devices, tablet computers, desktop computers, kiosks, and the like.

FIG. 1 also depicts a user input device, or a handheld device, in the form of a stylus pen 106 that is capable of touch interactions with the user interface 104 of the host device 102. While stylus pen 106 is a typical embodiment of the control device described herein, embodiments of the control device are not limited to a stylus pen 106, and may include control devices in other forms including stamps, and other devices that can be used to conduct touch interactions with the user interface 104, such as other fixed or detachable devices. One skilled in the art will appreciate that the touch interactions between the stylus pen 106 and the user interface 104 do not require the physical interaction of a portion of the stylus pen 106 and the surface of the user interface 104, and may also include interactions where the stylus pen 106 is moved over the surface of the user interface 104 without touching the surface (e.g., active stylus pen discussed below).

Figure 2:
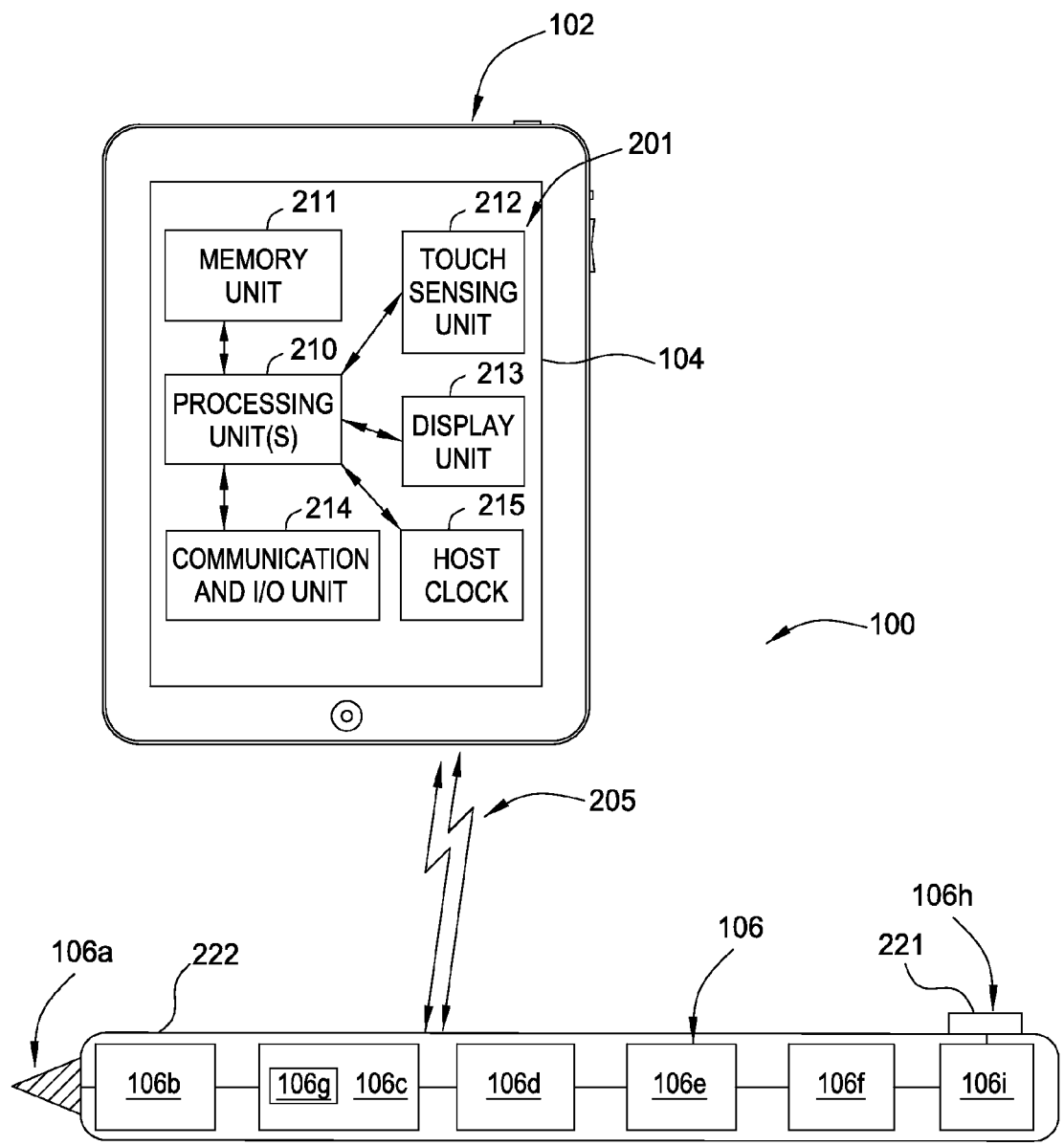
FIG. 2 is a simplified block diagram of the components of a host device and stylus pen according to an embodiment of the invention.

FIG. 2 schematically illustrates a system diagram showing a simplified view of the control elements of a host device 102, and a simplified system diagram of the control elements of a stylus pen 106. The host device 102 typically has at least some minimum computational capability, touch sensing capability and/or visual display capability. The host device 102 includes processing units 201 that may include, but is not limited to one or more processing units 210, a memory unit 211, a touch sensing unit 212, a display unit 213 and a communications unit 214. The touch sensing unit 212 may utilize resistive, capacitive (e.g., absolute sensing or mutual capacitance sensing), acoustic or other similar sensing and signal processing components, which are known in the art, to sense the input received from a user at the user interface 104. The touch sensing unit 212 may be disposed within and/or coupled to the user interface 104 in the host device 102. The display unit 213 may include various components that are able to display and/or visually render information provided to it by the one or more processing units 210 and memory 211. The display unit 213 may include any type of visual interface that includes light emitting diode (LED), organic LED (OLED), liquid crystal display (LCD), plasma, electroluminescence (EL), or other similar conventional display technology. The communications unit 214 will generally include one or more components that are configured to transmit and receive information via a communication link 205 between the host device 102, the stylus pen 106 and other possible peripheral devices via a desirable communication method. A desirable communication method may include a wired or wireless communication method, such as a Bluetooth low energy (BTLE) communication method, Bluetooth classic, WiFi, WiFi direct, near-field communication (NFC) or other similar communication method. The memory unit 211 generally contains computer readable media that can be accessed by the host device 102 and may include both volatile and nonvolatile media for storage of information, such as computer-readable or computer-executable instructions, data, programs and/or other data. Memory 211 may include computer or machine readable media or storage devices such as DVD's, CD's, floppy disks, tape drives, hard drives, optical drives, solid state memory devices, RAM, ROM, flash memory or any other device which can be used to store the desired information.

To allow the host device 102 to discriminate between the various inputs received from the user, the device should have a sufficient computational capability and system memory to enable basic computational operations. As illustrated by FIG. 2, the computational capability can be completed by one or more processing unit(s) 210 that are in communication with system memory 211. The processing unit(s) 210 may include conventional central processing units (CPUs), which include graphical processing units (GPU) and other useful elements to control the various display, touch, communication and other units in the host device 102. The processing unit(s) 210 may also include or be in communication with a host clock 215, which may be a simple IC or similar component that aids in the analysis and synchronization of data transferred between components in the host device and/or data transferred between the host device 102 and other connected wired and wireless network components (e.g., stylus pen 106).

In some embodiments, the stylus pen 106 may have one or more active regions that are able to collect additional information about the user's interaction with the host device 102. In one example, the one or more active regions may include an active tip of the stylus pen 106 that is positioned so that the user will cause this region of the stylus pen 106 to interact with the host device 102. The active tip of the stylus pen 106 may contain sensors that are able to measure some aspect of the interaction of the active tip and the host device 102. As schematically depicted in FIG. 2, the stylus pen 106 may include a pen tip 106a, a pressure sensing unit 106b, a processor 106c, a communications unit 106d, a memory unit 106e, a power source 106f and a pen clock 106g. In some embodiments, the stylus pen 106 may further comprise one or more additional sensors (not shown in FIG. 2), such as one or both of a gyroscope and an accelerometer.

Referring back to FIG. 2, the pen tip 106a is configured to make contact with the user interface 104 of the host device 102. The pressure exerted at the pen tip 106a is dependent on the user's interaction with the stylus pen 106.

The pressure sensing unit 106b is capable of detecting the amount of pressure applied to the pen tip 106a of the stylus pen 106 by the user. Pressure data corresponding to the amount of pressure exerted by the user with the user interface 104 of the host device 102 is measured by the pressure sensing unit 106b. The pressure data can include data from a binary switch, or other device that is able to discern between 8, 16, 32, 64, or any other desirable number of pressure levels so that the generated pressure data is useful for the control of the host device 102. In embodiments of the invention, different pressure levels can be used for different host devices 102, such that a stylus pen interaction will only be registered by the host device 102 when a threshold pressure level is detected. In some embodiments, the pressure data sensed by the pressure sensing unit 106b may also include an analog measurement of the pressure applied, and thus the generated pressure data supplied to the host device 102 may vary continuously across a desired range.

The processor 106c can be configured to control the operation of the stylus pen 106. The stylus pen 106 may be comprised of one or more processors to control various aspects of the operation of the stylus pen 106. The processor 106c may also include or be in communication with a stylus pen clock 106g, which may be a simple IC or similar component that aids in the analysis and synchronization of data transferred between components in the stylus pen 106 and/or data transferred between the stylus pen 106 and other wired and wireless network components (e.g., host device 102). In one embodiment, the stylus pen clock 106g is set at a speed that is at least as fast as the speed that a clock (e.g., host clock 215) in the host device 102 is running at to facilitate the timing of the delivery of communication signals from the communications unit 214. In general, it is desirable for the accuracy of the stylus pen clock 106g to be at least as accurate as the host clock 215 to assure that the time stamps applied to the touch data information generated by the stylus pen 106 and host device 104 does not appreciably drift relative to one another. Clocks that have appreciably different accuracies (e.g., frequency error rates) from one another will affect the accuracy and usefulness of the time stamp information that is transferred between the stylus pen 106 and host device 102. As discussed herein, the time stamp information provided by both the stylus pen 106 and the host device 102 can be used together to help differentiate the type of user input based on its timing relative to other touch events. In one example, the stylus pen clock 106g has a frequency error of less than about 50 parts per million (ppm), such as an accuracy of at least 30 to 50 ppm.

The communications unit 106d is capable of transmitting the pressure data from the stylus pen 106 to the communications unit 214 of the host device 102 when stylus pen interactions are made against the user interface 104 of the host device 102. In some embodiments of the invention, the communications unit 106d transmits the interaction data via a desirable wireless communication method, such as a Bluetooth low energy (BTLE) communication method. Other embodiments include other appropriate communications device components for transmitting interaction data between the stylus pen 106 and the host device 102. Interaction data supplied by the stylus pen 106 can comprise the pressure data, timing data, and/or orientation data generated from gyroscopes and/or accelerometers or the like in the stylus pen 106. In some embodiments, the communications unit 106d may only transmit the pressure data once a threshold pressure level has been detected by the pressure sensing unit 106b. In other embodiments, the communications unit 106d may transmit the pressure data from the stylus pen 106 once any pressure is detected, regardless of the pressure level detected by the pressure sensing unit 106b.

The memory unit 106e is capable of storing data related to the stylus pen 106 and data related to the host device 102, such as device settings and host clock 215 and stylus pen clock 106g information. For example, the memory unit 106e may store data related to the linking association between the stylus pen 106 and the host device 102.

The power source 106f is capable of providing power to the stylus pen 106. The power source 106f may be a built-in battery inside the stylus pen 106. The power source 106f can be electrically coupled to one or more of the components within the stylus pen 106 in order to supply electrical power to the stylus pen 106.

As noted above, some embodiments of the stylus pen 106 may be comprised of one or both of a gyroscope, an accelerometer, or the like. A gyroscope is a device configured to measure the orientation of the stylus pen 106 and operates based on the principles of the conservation of angular momentum. In certain embodiments, one or more gyroscopes are micro-electromechanical (MEMS) devices configured to detect a certain rotation of the stylus pen 106. To illustrate, the stylus pen 106 can be configured to send orientation data from a gyroscope contained within the stylus pen 106. This orientation data can be used in conjunction with the timing and pressure data communicated from the stylus pen 106 to the host device 102. In certain embodiments, the accelerometers are electromechanical devices (e.g., micro-electromechanical systems (MEMS) devices) configured to measure acceleration forces (e.g., static and dynamic forces). One or more accelerometers can be used to detect three-dimensional (3D) positioning. For example, 3D tracking can utilize a three-axis accelerometer or two two-axis accelerometers. According to some embodiments, the stylus pen 106 may utilize a 3-axis accelerometer to detect the movement of the stylus pen 106 in relation to the user interface 104 of the host device 102.

Input Discrimination Technique Examples

Figure 3A:
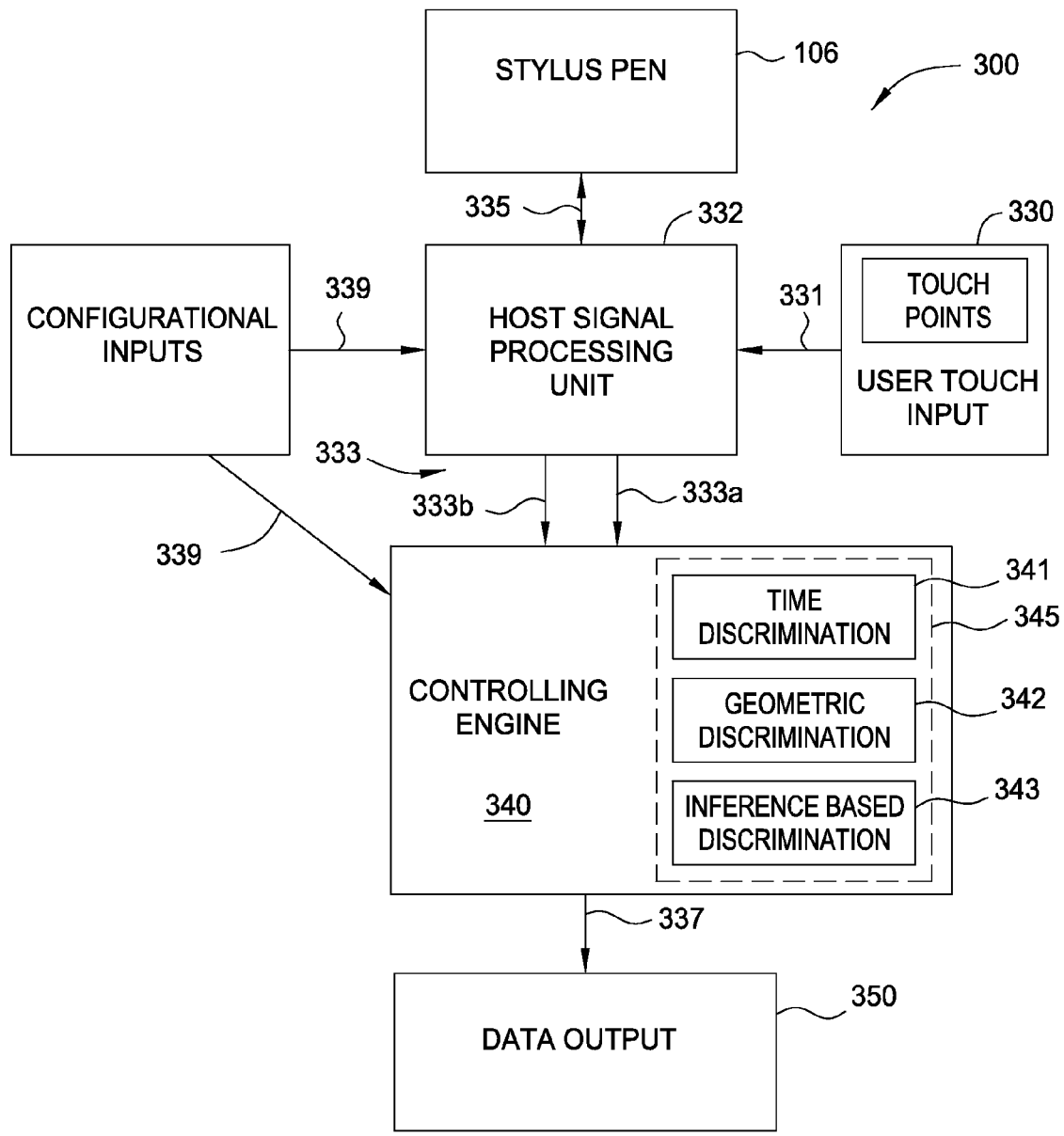
FIG. 3A is a simplified block diagram of a user input discrimination processing architecture used to distinguishing between the different types of user inputs received by the touch-screen tablet computer according to an embodiment of the invention.

FIG. 3A illustrates a simplified block diagram of a user input discrimination architecture 300 that comprise computer executable instructions and supporting hardware and software elements that are used to distinguish between the different types of user inputs received by the host device 102. In some embodiments, the system and methods described herein may provide a user input discrimination architecture 300 that includes a controlling engine 340 that receives various user input information and uses the received user input information to distinguish between the different types of user touch inputs received by the user interface 104 of the host device 102. In some configurations, the controlling engine 340 comprises computer executable instructions that are stored in the memory 211 of the host device 102, and are run in the background of the host device 102 by use of the processing units 201 of the host device 102.

The user inputs received by the controlling engine 340 may include a user touch related input 331, a stylus pen input 335 and/or a host input 333. While not intending to be limiting as to the scope of the invention described herein, the host input 333, which is delivered from the host signal processing unit 332 of the processing unit 210 to the controlling engine 340, may include the user touch related input 331 received from the user's physical touch input 330 received by the user interface 104, the stylus pen input 335 and other useful information relating to the control of the host device 102 collected by the processing unit 210. However, in some configurations of the host device 102, the host signal processing unit 332 is not a separate component within the host device 102, and may be formed within, and controlled by, the components used to provide the user's physical touch input 330 or even the controlling engine 340.

After receiving and analyzing the received user information, the controlling engine 340 may then deliver output data 350 that is used in the control of various software and hardware running on the host device 102. In one example, the output data 350 may be used by one or more third party applications and/or components in the host device 102 to perform some useful display or data output functions. In another example, the output data 350 may be used by the host device 102 to control some aspect of a software program running on the host device 102, to generate an image on a display in the host device 102 and/or process some data that is stored in the host device 102.

In general, the user touch related input 331 includes the user's physical touch input 330, which may include the interaction of a finger, an appendage and the physical interaction of the stylus pen 106 with the touch sensitive portion of the user interface 104. Typically, the touch related input 331 is processed by the host signal processing unit 332, such as capacitive sensing signal processing, before it is delivered to and then used by the controlling engine 340.

The user's input delivered to the host device 102, as illustrated in FIG. 2, may also include configurational inputs 339 that are delivered from the user and/or stylus pen 106 to the controlling engine 340. The configurational inputs 339 may include information about the user or stylus pen 106 that will help the user input discrimination architecture 300 distinguish between the different types of user touch input 331 information (e.g., information relating to touch input from a stylus pen, finger or appendage) received by the host device 102. The configurational inputs 339 may include whether the user is right-handed, left-handed, information about the host device 102, Bluetooth pairing information or other useful information about the user, stylus pen or controlling engine configuration.

The stylus pen input 335 generally includes user input information received by components in the stylus pen 106 that can be transferred via wired or wireless communication methods to the host device 102. The stylus pen input 335 may comprise the pressure data, timing data, and/or orientation data generated by the pressure sensing unit 106b or other sensors found in the stylus pen 106 (e.g., gyroscopes, accelerometers, etc.), such as touch signal generating device 106h which is discussed further below. In one embodiment, the stylus pen input 335 may be transmitted via a wireless communication link to the communications unit 214 of the host device 102 using a desirable wired or wireless communication technique, such as a Bluetooth low energy (BTLE) communication protocol, and then is delivered to the controlling engine 340. Typically, the stylus pen input 335 is processed by the host signal processing unit 332 in the host device 102 using wired or wireless communication protocols (e.g., BTLE protocols) before it is delivered to the controlling engine 340 via the host signal processing unit 332.

The host input 333 generally includes various sets of synchronous and/or asynchronous data that are received by the host device 102 from the stylus pen 106 and/or created by the user's physical touch input 330 received from the user. The host input 333, which is provided to the controlling engine 340, may include user touch input 331 generated by the touch sensing unit 212 and the stylus pen input 335 data provided by the stylus pen 106 to the communications unit 214 and host signal processing unit 332. In one example, the touch related input 331 data is delivered to the controlling engine 340 separately (i.e., input 333A) from the stylus pen input 335 data (e.g., input 333B). The separate host inputs 333A and 333B may not be transferred on separate physical elements to the controlling engine 340, but are shown herein separately to schematically illustrate the different types of data being delivered between the host device 102 and the controlling engine 340. In some embodiments, the communications unit 214 processes the transmitted stylus pen input 335 received from the stylus pen 106 via the communication link 205 before it is delivered to the controlling engine 340.

As briefly discussed above, the controlling engine 340 generally includes one or more executable programs or program related tasks that are used to create the output data 350 which is used by the controlling engine 340, software running on the host device 102 and/or one or more hardware components of the host device 102 to perform some useful function. The controlling engine 340 may comprise one or more input discrimination techniques 345 that are used separately or in combination generate useful and reliable output data 350. The one or more input discrimination techniques 345 take in the various different types of inputs (e.g., inputs 331, 333A, 333B, 335, 339) received by the host device 102 and try to determine the different types of user inputs from one another, so that the number of errors in the proper selection of an inputting element, such as a finger, stylus pen and/or appendage will be eliminated or less likely to occur. The one or more input discrimination techniques 345 are thus used to determine the different types of user inputs from one another and provide a desired "input label" or "element label" for each type of user input so that they can be correctly used by the one or more third party applications and/or components used in host device 102. In one embodiment, the one or more input discrimination techniques 345 include a time based discrimination technique 341, a geometric shape discrimination technique 342 and/or an inference based discrimination technique 343 that are used separately or in combination to generate useful and reliable output data 350 that can be used by the software and/or hardware running on the host device 102. In some configurations, the one or more input discrimination techniques 345 include a plurality of time based discrimination techniques, geometric shape discrimination techniques and/or inference based discrimination techniques.

Figure 3B:
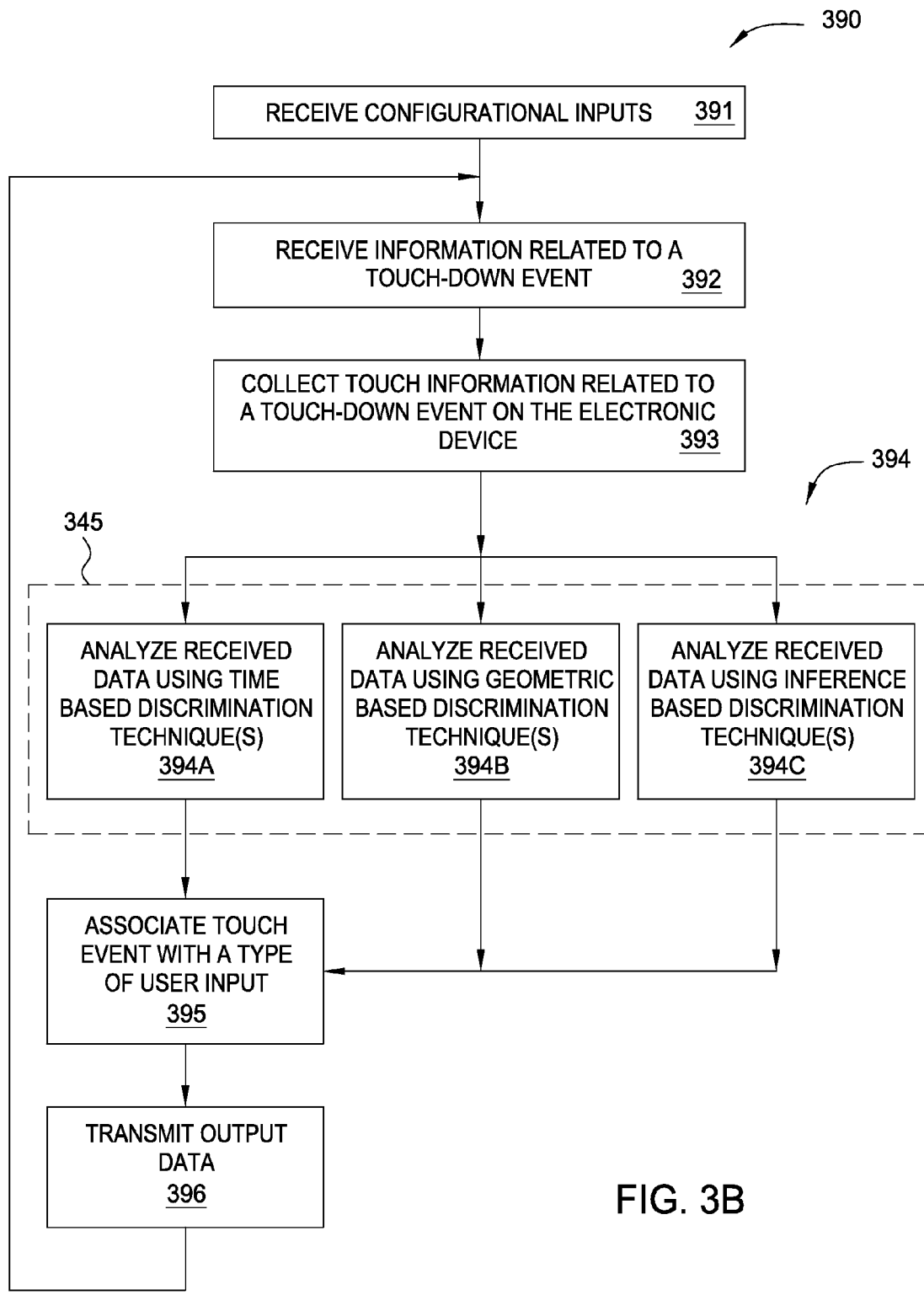
FIG. 3B is a flowchart illustrating a method of discriminating touch interactions from stylus pen interactions on a touch-screen according to an embodiment of the invention.

FIG. 3B is a flowchart illustrating a method 390 of discriminating between finger and appendage touch interactions and the physical stylus pen interactions with the host device 102 using one or more input discrimination techniques 345. The method 390 optionally starts with the delivery, storage in memory and/or recall of configurational inputs 339 by the controlling engine 340, as shown a step 391. As noted above, the configurational inputs 339 may include information about the user and/or stylus pen 106 that is useful for the discrimination of a finger or appendage touch interaction from the physical stylus pen interaction.

Next, at step 392, a stylus pen input 335, which is created when the stylus pen 106 is brought into contact with the user interface 104, is transferred via a wired or wireless communication technique to the host device 102 and controlling engine 340. The receipt of the stylus pen input 335 is also referred to herein as a "touch-down event." A "touch-down event" may be created from a single interaction or each time a user reengages the stylus pen 106 with the user interface 104 during a writing, drawing or other similar stylus pen 106 user input interaction with the user interface 104. In some embodiments, the controlling engine 340 will ignore the received user touch related input 331 data until it has received touch-down event information. In some embodiments, touch-down events do not require the physical contact of a portion of the handheld device and the surface of the user interface 104, but may also include sensed interactions where the stylus pen is moved over the surface of the user interface 104 without touching the surface, for example, by use of an active pen tip, which is discussed below.

Next, at step 393, once the stylus pen input 335 is received, a timing window of a desired length is created around the receipt of a stylus pen input 335 (e.g., touch-down event) in time, so that all of the user touch related inputs 331 can be collected for analysis by the controlling engine 340 to determine which of the touch inputs were received from the stylus pen, finger(s) or user's appendage. In one example, the timing window includes a time period of about 30 ms on either side of a received touch-down event. The timing window will include all user data received by and stored in memory 211 of the host device 102 in a first time period prior to the receipt of a stylus pen input 335 and second time period after the receipt of a stylus pen input 335. The length of the timing window (e.g., first time period plus the second time period) may be adjusted so that any external noise received by the host device 102 does not adversely affect the discrimination process performed by the controlling engine 340, while also assuring that all of the user touch related input 331 data that is associated with the stylus pen input 335 are captured. The length of the timing window will depend on the sampling frequency of the touch sensitive portion of the host device 102, the communication speed between the stylus pen 106 and host device 102 and the processing speed of the controlling engine 340. In one example, the sampling frequency of the stylus pen's generated data (e.g., pressure data generated by the pressure sensing unit 106b) is sampled at about a 1 millisecond (ms) rate and the communication speed between the stylus pen 106 and host device 102 is sampled at about a 30 ms rate. Once a touch-down event has occurred and at least one of the touch data points received by the user interface 104 has been associated by the one or more input discrimination techniques as being a physical stylus pen touch point, the controlling engine 340 may continue to track and provide user input discrimination results via the generation and delivery of the output data 350.

In general, it is desirable for the accuracy of the stylus pen clock 106g to be at least as accurate as the host clock 215 to assure that the time stamps applied to the touch data information generated by the stylus pen 106 and host device 104 does not appreciably drift relative to one another over time. Clock speeds in the stylus pen 106 and host device 104 that appreciably vary from one another will affect the relative accuracy of the time stamp information that is compared by the controlling engine to determine whether a user input can be attributed to a stylus pen, finger or user appendage. As discussed herein, the time stamp information may be used in some embodiments described herein to help differentiate the type of user input based its timing relative to other touch events. In one example, the stylus pen clock 106g has a frequency error of less than about 50 parts per million (ppm), such as an accuracy of at least 30 to 50 ppm. Therefore, the use of a stylus pen clock 106g that has an accuracy that is at least as good as the host clock 215 can help reduce the error in the detection and analysis of the user input. While the data transfer rate between the stylus pen 106 and the host device 102 is much greater than the touch data collection rate used by the components in the stylus pen 106 and host device 102, this will not affect the ability of the controlling engine 340 to determine the type of user input, since the use of accurate time stamp information in the data transferred between devices will prevent the slow data transfer rate from affecting the usefulness of the created touch data analyzed by the controlling engine.

In one embodiment of step 393, the controlling engine 340 creates a timing window of a desired length around the receipt of a first stylus pen input 335 (e.g., touch-down event) based on a first report received at a first time via the communication link 205 created between the stylus pen 106 and the host device 102. The controlling engine 340 then determines which touch data events fall within the first timing window and then notes that these touch data events are likely to be from a stylus pen 106. However, the number of touch data events that fall within a timing window can be larger than the number of actual touch data event(s) that are associated with the stylus pen 106. Therefore, to confirm or refute that touch data events that are likely not associated with the stylus pen 106, when the last report of this sequence sent by the pen is received by the controlling engine 340, the controlling engine will compare the touch data events found in this timing window with the touch data events found in the first timing window to determine which touch data events also stopped (touch take off (e.g., pen removed from interface)) in this window. Thus, touch data events that do not fit within these requirements are likely not related to the stylus pen and touch data event(s) that are in both windows are more likely to have originated from the stylus pen 106. In one example, the first report is generated when the stylus pen lands on the user interface 104, few reports are then generated as long as pen is pressed on the host device, and the last report is generated when the stylus pen 106 is removed from the user interface 104, and thus the controlling engine 340 is used to determine which of the touch events was associated with the stylus pen.

At step 394, the controlling engine 340 utilizes one or more of the input discrimination techniques 345 to discriminate between the touch interactions supplied by the stylus pen, a finger or user's appendage. One or more of the input discrimination techniques, such as time based discrimination techniques, geometric shape discrimination techniques or inference based discrimination techniques, which are discussed further below, perform an analysis of the touch-down event information and touch event information received in steps 392-393 to help distinguish between the source of the different touch event interactions received by the user interface 104. The controlling engine 340 may also utilize the configurational input 339 data received at step 391 during this step to help classify and further analyze the other received data. The analyses performed by the different input discrimination techniques 345, such as the analysis steps 394A-394C, utilize various different rules that are found within the software instructions that form at least part of the controlling engine 340. A discussion of some of the types of rules for each of the different types of input discrimination techniques 345 can be found below.

Next, at step 395, after performing the various analyses of the received and collected data, each of the one or more input discrimination techniques 345 are used to create and apply a "user input type" label, or also referred to herein as an "element label," to each of the touch data points for each touch event. The process of providing a "user input type" label generally includes the process of attributing each of the touch data points to a particular user's touch input, such as the physical input from the stylus pen, finger or appendage to the user interface 104. To reconcile any differences in the element labels given to each of the touch data points by the different input discrimination techniques, the element labels may be further analyzed by the controlling engine 340. In one embodiment of step 394 or 395, an inference based discrimination technique 343 (FIG. 3A) may be used to reconcile the differences between the element labels created by each of the input discrimination techniques used in step 394, which is further described below.

At step 396, each of the element labels for each of the touch data points are either further analyzed by the controlling engine 340 to reconcile differences between the element labels created by each of the input discrimination techniques or each of the different element labels are transferred within the output data 350, so that they can be used by the software and/or hardware running on the host device 102. The output data 350 may include the positional information (e.g., touch points) and timing information for only the relevant interacting components, such as a stylus pen 106 and a finger, and not the interaction of a user's appendage, by use of one or more input discrimination techniques 345.

After step 396 has been performed, steps 392-396 can then be repeated continually, while the stylus pen 106 is interacting with the user interface 104 or each time a touch-down event occurs to provide user input discrimination results via the generation and delivery of the output data 350.

FIGS. 3C-3D illustrate an example of the various user input information that may be received by the controlling engine 340 and the output data 350 results that may be generated by the controlling engine 340 using the steps provided in method 390, according to an embodiment of the invention described herein. FIG. 3C illustrates an example of data 370 that is received by the controlling engine 340, due to the interaction of a stylus pen 106, finger or user's appendage (e.g., palm) with the host device 102 as a function of time. FIG. 3D graphically illustrates at least a portion of the output data 350 generated by the controlling engine 340 (e.g., data 380), due to the interaction of a stylus pen 106, finger or user's appendage (e.g., palm) with the host device 102 as a function of time.

Referring to the example of FIG. 3C, at time $T_0$ the touch sensing component of the host device 102 (FIG. 2) receives interaction data 371 created by the interaction of an appendage (e.g., palm) with the host device 102. Next, at time $T_1$ the touch sensing component of the host device 102 also receives interaction data 372 created by the interaction of a stylus pen with the host device 102 (e.g., touch event). Next, at time $T_2$ the host device 102 also receives stylus pen input 335 data, or interaction data 373 (e.g., touch-down event). At time $T_3$ the touch sensing component of the host device 102 also receives interaction data 374 created by the interaction of a finger with the host device 102, and then at time $T_4$ the interaction of a finger with the host device 102 ends, thus causing the interaction data 374 to end. In this example, once the stylus pen input 335 is received by the controlling engine 340 at time $T_2$, a timing window having a desired length is created so that the stored user input received between a time before $T_0$ and time $T_2$ and the user input received between times $T_2$ and a time after $T_4$ can be characterized and useful output data 350 can be created. In some embodiments, the interaction data 371-374 received by the controlling engine 340 at any instant in time includes the coordinates of a touch data point and its timing information. One will note that the interaction data 371-374 includes the input data received over a period of time for each specific interacting element, and thus may contain many different touch data points that are in different coordinate positions on the user interface at different times. While FIG. 3C illustrates an example of various different types of interacting elements (e.g., stylus pen, finger, appendage) and a specific example of the timing of the interaction of these interacting elements with the host device 102, this example is not intended to be limiting, and is only added herein as a way to describe one or more aspects of the invention described herein.

FIG. 3D illustrates at least a portion of the output data 350 created by the controlling engine 340 using the one or more input discrimination techniques 345, based on the received interaction data 371, 372, 373, and 374 illustrated in FIG. 3C. At time $T_A$, which is at a time between time $T_0$ and time $T_1$, the controlling engine 340 has received a small amount of the received interaction data 371 created by the user. At time $T_A$, at least one of the one or more input discrimination techniques 345 used in step 394 by the controlling engine 340 are used to create and apply a user input type label to the interaction data 371, based on the input data received by the controlling engine 340 by time $T_A$. In general, as noted above, the input data may include the user touch related input 331, stylus pen input 335, host input 333 and configurational inputs 339. In some configurations, where the controlling engine 340 does not have enough data to decide what type of user input is being applied to the host device 102, it may be desirable to make an initial guess (e.g., finger, stylus pen and/or appendage) and then later correct the user input label as more data is acquired about the received user input. Therefore, in one example, the user input type label for the interaction data 371 is defined to be an "appendage" versus a "finger" or "stylus pen." Therefore, the output data 350 created at time $T_A$ includes the current positional information, current timing information and "appendage" element label for the interaction data 371. In some embodiments, any interaction data that is not given a stylus pen or finger type of element label is excluded from the output data 350 provided from the controlling engine 340 and thus no output data 350 is transferred for the interaction data 371 at time $T_A$, as illustrated in FIG. 3D as a dashed line.

Next, at time $T_B$, which is at a time between time $T_1$ and time $T_2$, the controlling engine 340 has received data regarding a user input that is creating the interaction data 371 and a new user input that is creating the interaction data 372. At time $T_B$, the one or more input discrimination techniques 345 of the controlling engine 340 are used to create and apply a user input type label to the interaction data 372 (e.g., step 394), based on the input data received by the controlling engine 340 by time $T_B$. In this example, the user input type label for the interaction data 372 is initially defined as a "finger" based on the one or more input discrimination techniques 345. Typically, the controlling engine 340 is continually collecting the interaction data 371 and 372 information and thus can continually reevaluate the user input type label for the received interaction data 371 and 372.

Next, at time $T_C$, which is at a time between time $T_2$ and time $T_3$, the controlling engine 340 has received data regarding the user inputs that are creating the interaction data 371 and 372, and a new user input that is creating the interaction data 373. As noted above, the interaction data 373 comprises stylus pen input 335 data created by one or more sensors found in the stylus pen 106. In this example, the interaction data 373 is generated due to a user initiated pen tip 106a touch event that actually occurred at time $T_1$. However, the delivery of the interaction data 373 to the controlling engine 340 has been delayed from the interaction data 372 received by the stylus pen's interaction with the touch sensing unit of the host device 102 by a signal delay time 375 (FIG. 3C). The signal delay time may be created by communication processing timing delays, differences in the clocks of the stylus pen 106 and host device 102 and/or communication/timing errors created within the stylus pen 106 or the host device 102. The data delivered in the transferred interaction data 373 may be generated by the pressure sensing unit 106b and then transferred to the communications unit 214 of the host device 102 through the communications unit 106d of the stylus pen 106. At time $T_C$, the one or more input discrimination techniques 345 of the controlling engine 340 are used to create and apply a user input type label to the interaction data 373, based on the input data received by the controlling engine 340 by time $T_C$. In this example, the interaction data 372 and 373 are associated with each other and are given a "stylus pen" user input type label due to the information received and processed by the one or more input discrimination techniques 345, which is an adjustment from the initial element label given to the interaction data 372. The output data 350 provided to the hardware or other software running on the host device 102 at time $T_C$ will thus contain the stylus pen 106's positional and timing data associated with the interaction data 372 and the stylus pen's pressure data, stylus pen related timing data, and/or stylus pen orientation data associated with the interaction data 373, while the "appendage" related data found in the interaction data 371 is still being excluded. It should be noted that the controlling engine 340 will still collect the interaction data 371, 372 and 373 information, and thus can continually reevaluate the user input type labels as needed.

In general, signal delay time 375 can be created by mechanical and electrical delays that are created during the collection and transmission of the information between the stylus pen 106 and the controlling engine 340 running in the host device 102, and also created by the controlling engine, which may not be synchronized with the wired or wireless communication arrival (e.g., BTLE information). Delays may also be generated due to higher priority tasks being completed by the processing unit 210 and/or controlling engine 340, which may cause a delay in the analysis of the received touch data. In some examples, the mechanical delays may include delays created by inertia and/or friction in the pen tip 106a and/or pressure sensing components in a pressure sensing unit 106b of the stylus pen 106. In some examples, the electrical delays may results from the propagation delays created by one or more electrical components in the host device or stylus pen (e.g., low-pass filters (LPFs) and ADCs) and processing delays created due to the need to transmit and/or convert the data for transmission via a wireless transfer technique (e.g., BTLE) or use by one or more processing components in the stylus pen 106 or host device 102. In some embodiments, to prevent the signal delay time 375 (FIG. 3C) from causing mischaracterization of the user input data, it is desirable to encode any transferred data with a timestamp that is at least based on the clock of the device transmitting the desired information. In one example, the sampling rate of the sensing components user interface 104 may be running at a speed of about 16 milliseconds (ms) and the sampling rate of the components in the stylus pen is less than about 16 ms. In one example, the sampling rate of the data sampling components in the stylus pen is less than about 10 ms, such as between about 1 ms and about 10 ms. The provided timestamp information is thus used to help better correlate the multiple sets of data that are received by the controlling engine 340, so that a reliable characterization of the user inputs can be made.

However, since the host clock 215 and the stylus pen clock 106g, which are used to generate and/or facilitate the transfer of data between the stylus pen 106 and host device 102, are generally not synchronized, and in some cases may be running at different speeds, errors in the characterization and processing of the received user input data are not reliably eliminated by use of a single timestamp. In one example, these errors may include errors in the proper selection of a user's input and can cause jitter in the display which will ultimately annoy the user or cause significant disruption in the tasks that the user is performing on the computing device. It has been found that providing the timing data from both the stylus pen clock 106g and the host clock 215 in the data transferred between the devices in either direction helps significantly reduce any error in the mischaracterization of the user input. In general, the controlling engine 340 and/or user input sensing program(s) being executed in the stylus pen 106 use both sets of timestamp information received in the transferred data to continually update the processes running in each device to account for any drift or difference in the timing found between the stylus pen clock 106g and host clock 215. As noted above, the difference in the timing found between the stylus pen clock 106g and host clock 215 will generally affect the analysis of the user input received by the controlling engine 340. Therefore, in one embodiment, all communications provided between the host device 102 and the stylus pen 106 will include the latest time information received from the stylus pen clock 106g and the time information received from the host clock 215, so that the controlling engine 340 can receive and can continually correct for errors found between the stylus pen clock 106g and the host clock 215.

Next, at time $T_D$, which is at a time between time $T_3$ and time $T_4$, the controlling engine 340 has received data regarding a user input that is creating the interaction data 371, 372 and 373, and the new user input that is creating the interaction data 374. At time $T_D$, the one or more input discrimination techniques 345 of the controlling engine 340 are used to create and apply a user input type label to the interaction data 374, based on the input data received by the controlling engine 340 by time $T_D$. In this example, the user input type label for the interaction data 374 is initially defined as a "finger" based on the one or more input discrimination techniques 345. It should be noted that the controlling engine 340 will still collect the interaction data 371, 372, 373 and 374 information, and thus can continually reevaluate the user input type labels as needed.

Next, at time $T_E$, which is at a time between time $T_4$ and time $T_5$, the controlling engine 340 has received interaction data 371, 372 and 373, while the interaction data 374 has not been received after the time $T_4$ was reached. At time $T_E$, the one or more input discrimination techniques 345 continually reevaluate the user input type labels for the interaction data 371-373, based on the input data received by the controlling engine 340, however, the tracking and characterization of the user input relating to the interaction data 374 will generally be halted due to the removal of this user input. In some embodiments, all of the user's inputs will be continually tracked and characterized while they are interacting with the host device 102, and be dropped from output data 350 when their interaction with the host device 102 ends. In some cases, the controlling engine 340 may use the one or more input discrimination techniques 345 to track and provide user labels for user interactions that are suspended for times shorter than a specified period of time, such as when a stylus pen 106 is lifted from the touch sensitive surface of the host device 102 for only a short time to write, draw or input some different pieces of information on the host device 102.

Time Based Input Discrimination Technique Examples

Embodiments of the invention described herein may provide a system and method that analyzes the timing of the received user's input data to determine the source of the user input delivered in the user's physical touch input 330 (e.g., physical stylus pen, finger(s) and user appendage touch input) to the controlling engine 340. During operation the controlling engine 340 analyzes the timing of the user input data to determine the different types of received user's physical touch input 330, which is often referred to herein as the time based user input discrimination technique. In one example, the time based user input discrimination techniques can be used to determine if the received user input was created by a stylus pen, finger(s) or user's appendage by comparing the relative timing of the different user's physical touch input 330 events and stylus pen input 335. The time based discrimination techniques used by the controlling engine 340 will generally compare the various received user input data as a function of time to help the controlling engine 340 discriminate between the interaction of a stylus pen, fingers or an appendage. The time based user input discrimination techniques discussed herein may be used alone or in combination with one or more of the other user types of input discrimination techniques discussed herein.

Figure 4:
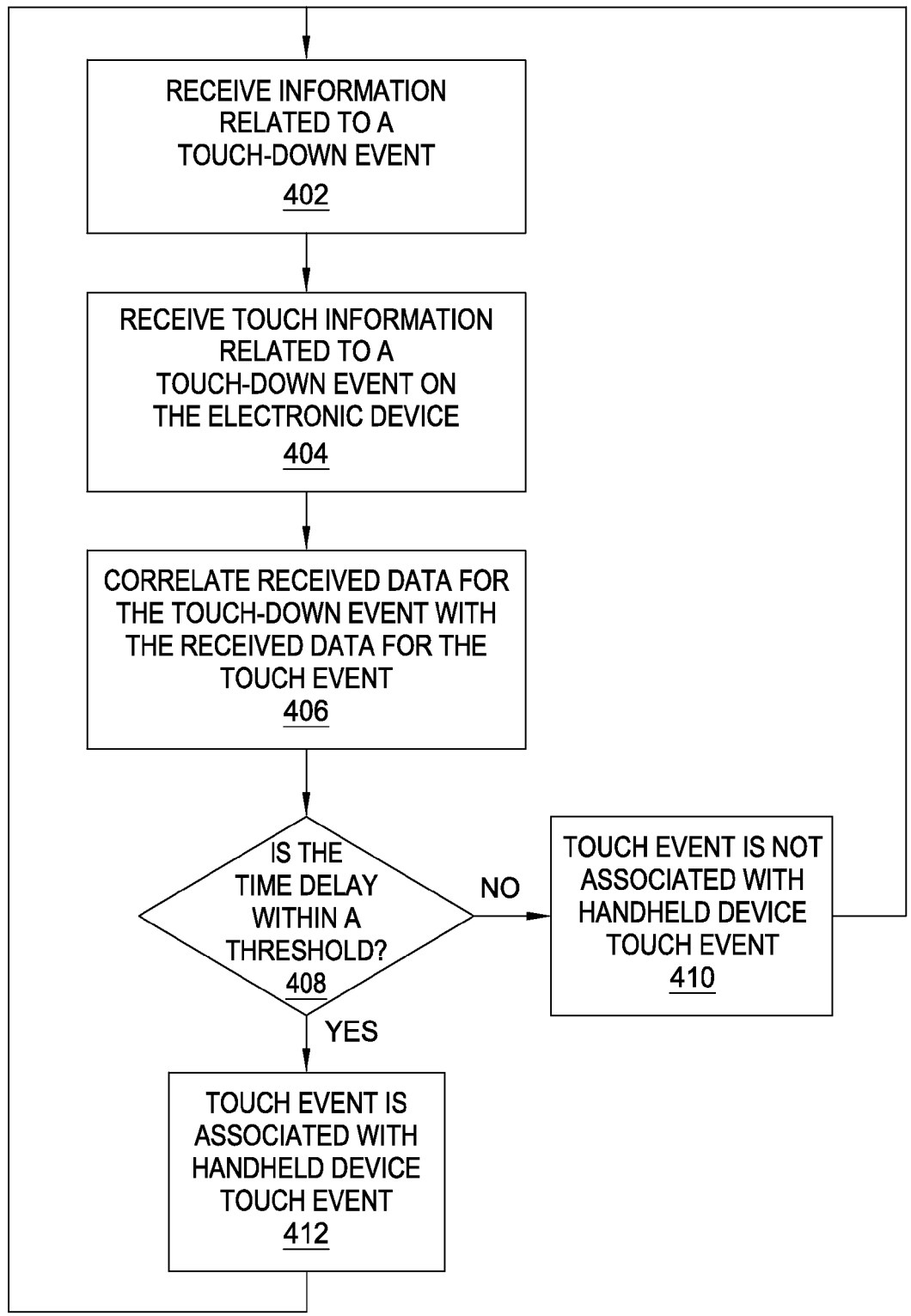
FIG. 4 is a simplified flowchart illustrating a method of discriminating touch interactions from stylus pen interactions on a touch-screen according to an embodiment of the invention.

FIG. 4 is a simplified flowchart illustrating a time based user input discrimination technique for discriminating touch interactions from the physical stylus pen interactions on a touch-screen according to an embodiment of the invention. The method 400 can be performed by processing logic that may comprise hardware (circuitry, dedicated logic, etc.), software (such as is run on a general purpose computing system or a dedicated machine), firmware (embedded software), or any combination thereof that are contained in the host device 102 and/or the stylus pen 106. In one embodiment, the method 400 is performed by the controlling engine 340 that is running in the background of the host device 102 and/or the data collection and transmission processes running on components in the stylus pen 106.

The method may include step 402, in which the controlling engine 340 receives user input (e.g., user touch input 331 or stylus pen input 335) information related to a touch-down event on the host device 102. According to embodiments of the present invention, information related to a touch-down event is received from a handheld device. The handheld device may be an electronic stylus pen, such as a stylus pen 106, comprising a pressure sensor (e.g., pressure sensing unit 106b) touch signal generating device 106h that is configured to deliver stylus pen input 335 information to the host device 102. In some embodiments of the present invention, the electronic pen may also be comprised of at least one of an accelerometer or a gyroscope.

The information related to the touch-down event that is transferred to the controlling engine 340 may comprise timing information, pressure data, and other data (e.g., accelerometer and/or gyroscope data) that is sent from the stylus pen 106 via the communication link 335 to the host device 102. For example, the information related to the touch-down event may include a first timestamp for the touch-down event, and may include information related to when the touch-down event occurred, how much pressure was applied in the touch-down event, and the length of time of the touch-down event. In another example, the information related to the touch-down event may include a pen clock timestamp derived from a pen clock signal received from the pen clock 106g and a host clock timestamp derived from a host clock signal received from the host clock 215 for the touch-down event, and may include information related to when the touch-down event occurred, how much pressure was applied in the touch-down event, and the length of time of the touch-down event.

Next, at box 404, the method includes the controlling engine 340 receiving information related to a touch event sensed by the host device 102. The touch event may be from the stylus pen 106 physically interacting with the user interface 104 of the host device 102, or by a touch interaction from the direct contact with the user interface 104 by a finger and/or appendage of the user. According to embodiments of the present invention, the information related to the touch event may comprise a second timestamp for the touch event, which may include timing information related to when the touch event occurred. In one embodiment, the second timestamp comprises a pen clock timestamp derived from a pen clock signal received from the pen clock 106g and a host clock timestamp derived from a host clock signal received from the host clock 215 for the touch event.

According to embodiments of the present invention, the information related to the touch event and the information related to the touch-down event may be received by the device simultaneously or at different times.

Next, at box 406, the method also includes correlating the information related to the touch-down event with the information related to the touch event. In one example, the controlling engine 340 correlates the information related to the touch-down event with the information related to the touch event. According to embodiments of the present invention, first time information for the touch-down event is correlated with second time information for the touch event.

Next, at box 408, the method also includes determining whether the time delay between the first timestamp for the touch-down event and the second timestamp for the touch event is less than an empirically predetermined threshold. According to embodiments of the present invention, the controlling engine 340 determines whether the time delay is within a predetermined threshold. For example, if the time delay between the touch-down event and the touch event are greater than the predetermined threshold, which may indicate that the touch event is separate from the touch-down event, as illustrated in step 410. In that event, the controlling engine 340 would distinguish that touch event as not being associated with the stylus pen 106. The controlling engine 340 may distinguish the touch event as being associated with the user's finger.

Alternatively, if the time delay between the touch-down event and the touch event are equal to or less than the predetermined threshold, that may indicate that the touch event is associated with the touch-down event, as illustrated in box 412. In that event, the host device 102 would register that touch event as being associated with the stylus pen 106 and not the user's finger or user's appendage.

Once the determination has been made, the controlling engine 340 continues to monitor incoming touch-down event(s) and touch events, correlates the received data, and makes a determination as to whether the touch event is associated with the stylus pen 106, the touch interactions by the user's fingers and/or appendage of the user.

It should be appreciated that the specific steps illustrated in FIG. 4 provide a particular method of 400 according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Geometric Based Input Discrimination Technique Examples

Embodiments of the invention described herein may also provide a system and method that uses one or more geometric based user input discrimination techniques to distinguish between the different types of user's physical touch input 330 information received from a stylus pen, finger or user's appendage by a touch sensitive device. The one or more input discrimination techniques may include a geometric shape discrimination technique that uses information relating to the relative position of multiple touch points supplied by the user to help discriminate between the interaction of a stylus pen, fingers or an appendage. The geometric based user input discrimination techniques discussed herein may be used separately or in combination with one or more of the other user input discrimination techniques to distinguish between the various different types of user inputs received by the computing device. In some embodiments, the use of one or more of the geometric based input discrimination techniques with one or more of the time based input discrimination techniques will help improve the accuracy of the user input discrimination created by either technique on their own.

In some embodiments, as noted above, it is desirable for the host input 333 (FIG. 3A), which is provided to the controlling engine 340 via portions of the host device 102, to only include a simplified data set that just includes the coordinates (e.g., X and Y-direction coordinates) of each of the touch data points 556 and the time that the interaction occurred with the user interface 104. Typically, this simplified data set is a small fraction of the amount of the data that is commonly collected by conventional touch sensitive handheld devices or touch sensitive display type computing devices. The creation and use of the simplified data to discriminate between the interaction of a stylus pen, fingers or an appendage can reduce the required computing power of the host device and/or increase the speed of the computing device by reducing the computational power required to collect and transfer the touch interaction data. Alternately, in some configurations, the controlling engine 340 does not have access to the actual user interaction data collected from the user interface 104 and is only fed a simplified data set from the host device 102. In this case, the controlling engine 340 must discriminate between the interaction of a stylus pen, fingers or an appendage based on the limited nature of the data supplied to it by the host device 102.

Figure 5A:
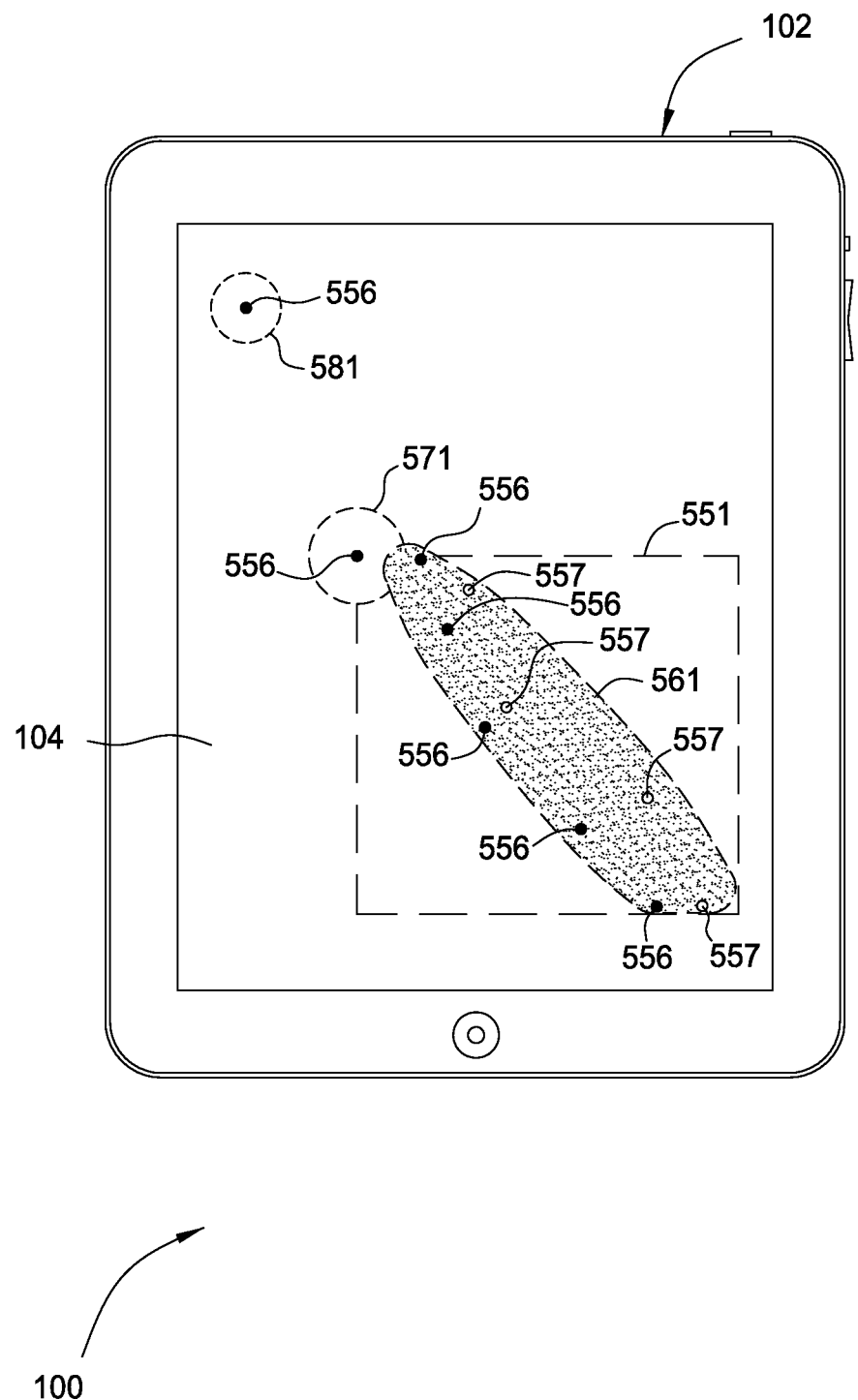
FIG. 5A illustrates a plurality of related touch points on a touch-screen tablet computer that have been analyzed by a controlling engine according to an embodiment of the invention.

FIG. 5A schematically illustrates a plurality of touch data points 556 that have been detected by the user interface 104 of the host device 102 and delivered to the controlling engine 340 for the discrimination of the various different types of user inputs. In general, the geometric shape discrimination technique 342 used by the controlling engine 340 includes a method of sorting and grouping of the received touch data points 556 by their geometric location based on geometric rules coded into the controlling engine 340. Each of the touch data points 556 will be separately analyzed by the controlling engine 340 to determine if they can be associated with the stylus pen, finger or part of the user's appendage. The geometric shape discrimination technique 342 uses geometric rules to provide element labels to one or more clusters of touch points, since it is often likely that these clusters of touch points are related to a specific type of user input, such as a user's palm or finger. For example, if the controlling engine 340 knows that the user is right handed, based on information received from a configurational input 339 or by prior analysis of received touch data points 556, the controlling engine 340 can apply a rule that specifies that a stylus pen related touch point will be above and to the left of a group of touch points that are associated with a palm of the user.

To determine the likely type of user input a touch data point 556 may be associated with, the controlling engine will generally use the current touch point data received by the user interface 104 and stored old touch data points that had been previously received by the controlling engine 340 (e.g., also referred to herein as "aging" touch data points). In one example, older touch data points, which had each been previously analyzed and characterized by the controlling engine 340, are used to help determine the type of user input that is associated with the current received touch data point 556. Use of the older touch data points and its relationship to the new touch data points can improve the speed and accuracy by which the current touch data points can be associated with a type of user input. In some configurations, the older touch data points are retained, analyzed and/or used by the controlling engine 340 for only a short period of time before they are deemed not useful and are excluded from use.

In one embodiment, the controlling engine 340 is configured to group the touch data points 556 into at least one of a pen region 571, an appendage region 561 or a finger region 581. Therefore, based on the position of each touch data point 556 in relation to other touch data points 556, the geometric shape discrimination technique 342 can determine that one or more touch points, at any instant in time, is likely to be associated with stylus pen, finger or part of the user's appendage. The various regions defined by the controlling engine 340, such as pen region 571, an appendage region 561 or a finger region 581, can be formed around clusters of touch data points that have been associated with the same type of user input. For example, the appendage region 561 illustrated in FIG. 5A contains a cluster of the touch data points 556 that have been associated with the user's appendage.

The controlling engine 340 may also create and use a geometric boundary region 551 to help prioritize the analysis of the received touch data contained therein as being likely to contain useful user input data. In one example, the geometric boundary region 551 may include a region that includes a touch point that is associated with a stylus pen and one or more touch points that are associated with an appendage, since it is likely that a pen touch point will be near touch points that are associated with a palm of the user. In one embodiment, the geometric boundary includes all of the touch points supplied to the user interface 104 that have been received at an instant in time. The controlling engine 340 may use the position of the touch points within the geometric boundary to help decide what type of user input has been received. In one example, touch data points that are near the boundaries of the geometric boundary may be more likely to be from a stylus pen.

Referring to FIG. 5A, in one example, the controlling engine 340 has applied the various geometric based rules and determined that a group of touch points are associated with an appendage region 561, a touch point is associated with a stylus pen (e.g., within the defined pen region 571) and a touch point is associated with a finger (e.g., within the defined finger region 581). In this example, the controlling engine 340 compares each of the currently received touch data points 556 with older touch data points 557 to determine the likely type of user input that has been received by the controlling engine 340. In this example, the controlling engine 340 thus may determine that the user's appendage has shifted down and to the left based on the comparison of the touch data points 556 that are found in the appendage region 561 with the older touch data points 557. This created geometric analysis data can then be used by other components in the host device 102, or likely in this case be excluded from the output data 350 set.

Figure 5B:
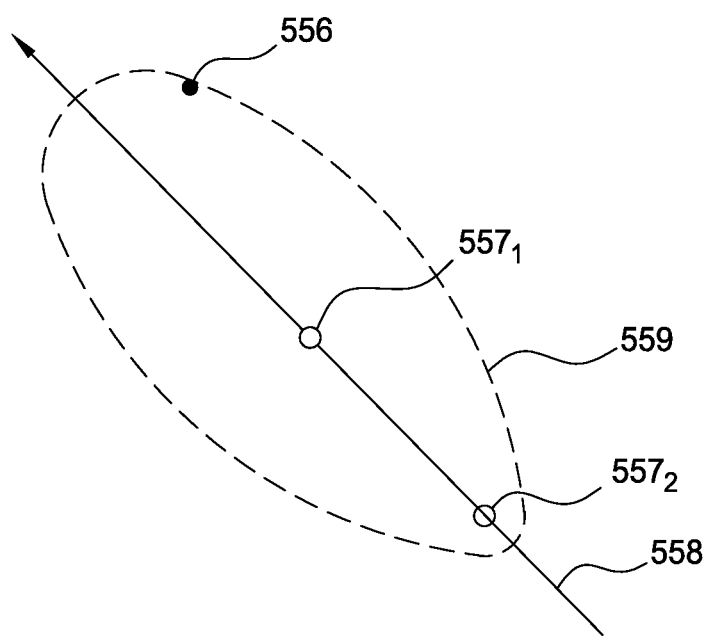
FIG. 5B illustrates a plurality of related touch points on a touch-screen tablet computer that have been analyzed by a controlling engine according to an embodiment of the invention.

In an effort to provide more accurate determination of the type of user input it is often desirable to use the change in position of two or more older touch data points 557 to predict the likely position of the next touch point (e.g., touch data point 556). Use of this predictive technique to help characterize the type of user input can reduce the errors created by incorrectly assigning an element label to a touch data point. In one embodiment, as illustrated in FIG. 5B, the geometric shape discrimination technique 342 creates and uses a predicted data point region 559 that it uses to help determine the element label for a newly received touch data point 556. In this example, a first touch data point $557_1$ and a second touch data point $557_2$ are used to form a predicted direction 558 for the next touch data point and the predicted data point region 559. The touch data point 556 in this example happens to fall within the predicted data point region 559, and thus would have higher likelihood of being a continuation of this specific input received from the user, such as an touch data point input received by a stylus pen 106. The controlling engine 340 therefore takes into account the higher likelihood that a touch data point is of a certain type when it is assigning an element label to that touch data point. The controlling engine may adjust the size and shape of the predicted data point region 559 due to the speed of the user input, which is determined based on the movement of the older touch data points 557.

In some configurations, the one or more geometric shape discrimination techniques 342 compare the movement of a touch data point, or cluster of touch data points, with the movement of a touch data point that is associated with a stylus pen, to determine if this cluster of points may be associated with an appendage (e.g., palm) following the stylus pen. In one example, a touch point or cluster of touch data points that move parallel to the direction of the movement of a touch data point that is associated with a stylus pen is labeled as being a palm.

Figure 5C:
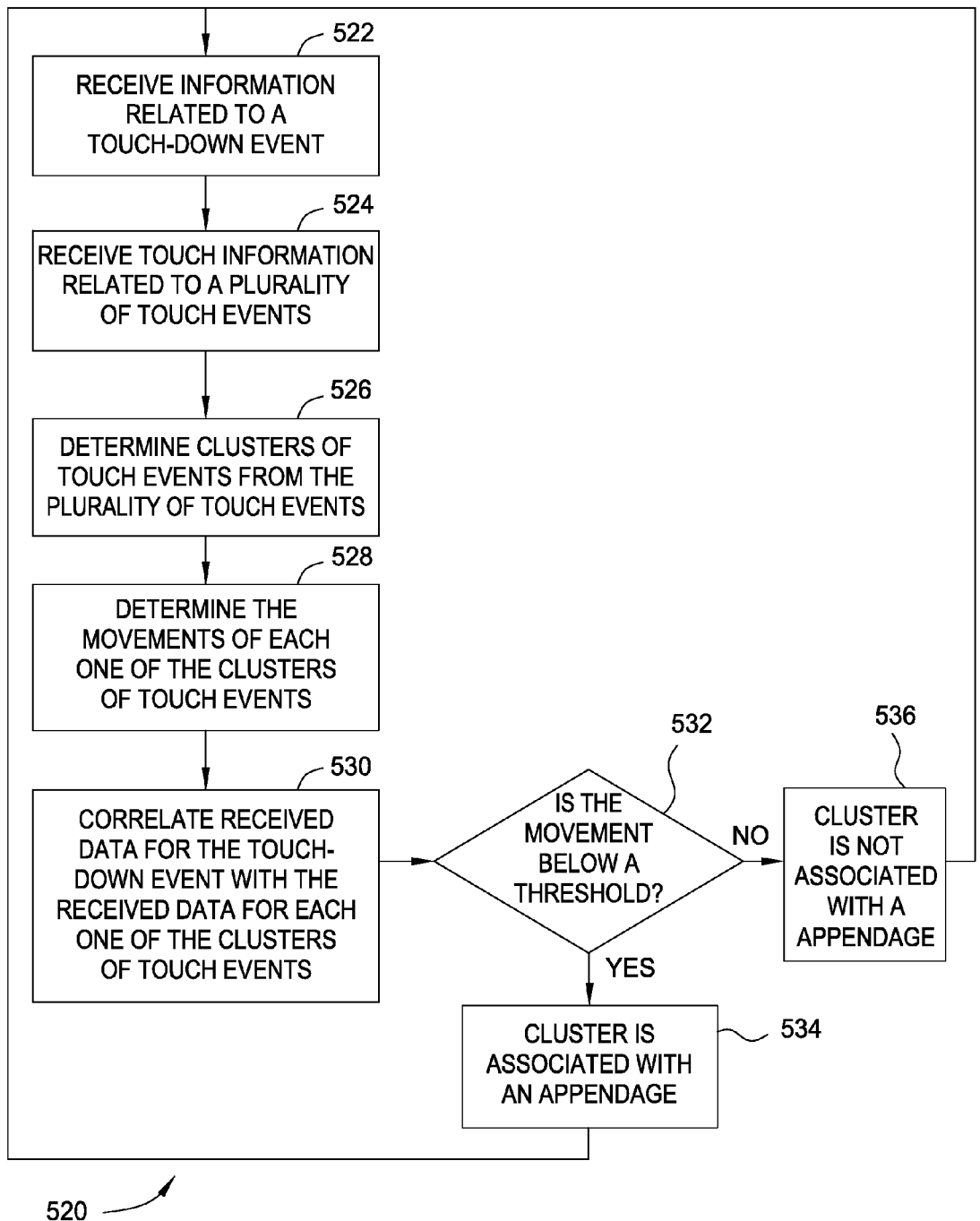
FIG. 5C is a simplified flowchart illustrating a method of discriminating interactions caused by the palm of a user on a touch-screen according to an embodiment of the invention.

FIG. 5C is a simplified flowchart illustrating a method of discriminating interactions caused by an appendage, such as a palm of a user on a touch-screen according to an embodiment of the invention. The method 520 is performed by processing logic that may comprise hardware (circuitry, dedicated logic, etc.), software (such as is run on a general purpose computing system or a dedicated machine), firmware (embedded software), or any combination thereof that are contained in the host device 102 and/or the stylus pen 106. In one embodiment, the method 520 is performed by the controlling engine 340 that is running in the background of the host device 102 and/or the data collection and transmission processes running on components in the stylus pen 106.

At step 522, the method includes receiving information related to a touch-down event on the host device 102. The information related to the touch-down event that is transferred to the controlling engine 340 may comprise timing information, pressure data, and other data that is sent from the stylus pen 106 via the communication link 335 to the host device 102. For example, the information related to the touch-down event may comprise a first timestamp for the touch-down event, and may include information related to when the touch-down event occurred, how much pressure was applied in the touch-down event, and the length of time of the touch-down event. In another example, the information related to the touch-down event may comprise a pen clock timestamp derived from a pen clock signal received from the pen clock 106g and a host clock timestamp derived from a host clock signal received from the host clock 215 for the touch-down event, and may include information related to when the touch-down event occurred, how much pressure was applied in the touch-down event, and the length of time of the touch-down event. According to embodiments of the present invention, the information related to the touch-down event is received from a handheld device, such as a stylus pen 106.

Next, at box 524, the method also includes receiving information related to a plurality of touch events on the host device 102. The plurality of touch event may be from an appendage of the user, such as a palm of the user resting on the surface of the user interface 104 of the host device 102. The plurality of touch event may also be from the stylus pen 106 interacting with the user interface 104 of the host device 102, or by a touch interaction from the direct contact with the user interface 104 by a finger or appendage of the user. According to embodiments of the present invention, the information related to the touch event may comprise a second timestamp for the touch event, which may include timing information related to when the touch event occurred. In one embodiment, the second timestamp comprises a pen clock timestamp derived from a pen clock signal received from the pen clock 106g and a host clock timestamp derived from a host clock signal received from the host clock 215 for the touch event.

Next, at box 526, the method also includes determining or defining one or more clusters of touch events from the plurality of touch events provided to the controlling engine 340 from the stylus pen 106 and host device 102. According to embodiments of the present invention, there may be touch events occurring from the finger of the user, from the stylus pen 106 interacting with the user interface 104 of the host device 102, or from an appendage of the user, such as a palm resting on the user interface 104 of the host device 102.

Next, at box 528, the method also includes determining the movements of each one of the clusters of touch events. According to embodiments of the present invention, the controlling engine 340 in the host device 102 can determine the movements of each one of the clusters of touch events based on the interactions between each one of the clusters of touch events and the user interface 104 of the host device 102. For example, the controller in the host device 102 can determine the movement of each one of the clusters of touch events across the user interface 104 of the host device 102, or can determine that one or more of the clusters of touch events are stationary. According to embodiments of the present invention, determining one or more clusters of touch events from the plurality of touch events may comprise detecting the location of each touch event in the plurality of touch events and associating each touch event into one or more clusters of touch events. In some embodiments, associating each touch event into one or more clusters of touch events is based on relative distances between each touch event in the plurality of touch events. For example, touch events may be considered associated in the same cluster of touch events when they are within a predetermined distance from each other.

Next, at box 530, the method may also include correlating the information related to the touch-down event with the information related to the plurality of touch events. According to embodiments of the present invention, the touch-down event and plurality of touch events may be correlated based on information received by the controlling engine 340 relating to the touch-down event and the plurality of touch events. The information includes, but is not limited to, timing information received from the stylus pen 106 or movement of the plurality of touch events detected by the controlling engine 340 of the host device 102.

Next, at box 532, the method may also include determining whether the movement is below a threshold distance. In this step, the controlling engine 340 may determine whether the movement of each cluster of touch events is less than a predetermined threshold distance. For example, the predetermined threshold may be set to a numerical value specifying a particular distance of movement. If the controlling engine 340 determines that the movement of one of the clusters of touch events moves less than the predetermined threshold, the cluster of touch events may be determined to be associated with an appendage of a user, as illustrated in box 534, such as a palm as it may be more likely to have a smaller movement or lack of movement, since the palm of the user is resting on the user interface 104 of the host device 102. On the other hand, if the controlling engine 340 determines that the movement of one of the cluster of touch events moves greater than the predetermined threshold, the cluster of touch events may be determined as being from a stylus pen or a finger, and thus are not associated with the appendage of a user, as illustrated in box 536. In such cases, timing information may be used to determine whether the cluster of touch events is from a stylus pen 106 or from a finger of the user interacting with the user interface 104 of the host device 102. In one example, the one or more of the input discrimination techniques try to determine whether an interaction is from a stylus pen and then tries to decide whether the interaction is from a non-stylus pen, or vice versa Once the determination has been made, the controlling engine 340 continues to monitor incoming touch-down event and touch events, correlates the received data, and makes a determination as to whether the touch event is associated with the stylus pen 106, touch interactions by the user's fingers, or a touch interaction caused by the user's appendage resting on the user interface 104 of the host device 102, and then generates the output data 350 that is provided to software and hardware components running on the host device 102.

It should be appreciated that the specific steps illustrated in FIG. 5C provide a particular method of 520 according to an embodiment of the present invention. Other sequences of steps may also be performed according to alternative embodiments. For example, alternative embodiments of the present invention may perform the steps outlined above in a different order. Moreover, the individual steps illustrated in FIG. 5C may include multiple sub-steps that may be performed in various sequences as appropriate to the individual step. Furthermore, additional steps may be added or removed depending on the particular applications. One of ordinary skill in the art would recognize many variations, modifications, and alternatives.

Therefore, in some embodiments, the various geometric based rules applied by the controlling engine 340 may include increasing the likelihood that a touch data point 556 that is positioned a threshold distance from a previous touch data point that was characterized as a stylus pen is also a pen touch data point, a touch data point 556 that is positioned outside a defined appendage region 561 it is likely a stylus pen or a finger input, a touch data point 556 that is positioned in the same general direction that a "stylus pen" associated touch data point had moved is also likely a pen touch data point, and that a touch data point that has not moved over one or more touch sampling intervals is also likely an appendage touch point. These geometric rule examples, and types of user input used with these rule examples, are not intended to be limiting as to scope of the invention described herein.

Inference Based Input Discrimination Technique Examples

Embodiments of the invention described herein may also include a system and method that utilizes one or more inference based user input discrimination techniques to determine whether it is likely that a user input was received from a stylus pen, finger or appendage by a touch sensitive device. The inference based discrimination techniques used by the controlling engine will generally compare the received user input data with predefined and/or relevance-weighted rules to help discriminate between the interaction of a stylus pen, fingers or an appendage. The inference based user input discrimination techniques discussed herein may be used by themselves or in combination with one or more of the other user types of input discrimination techniques discussed herein to discern between the various different types of inputs received by the computing device.

Figures 6A, 6B:
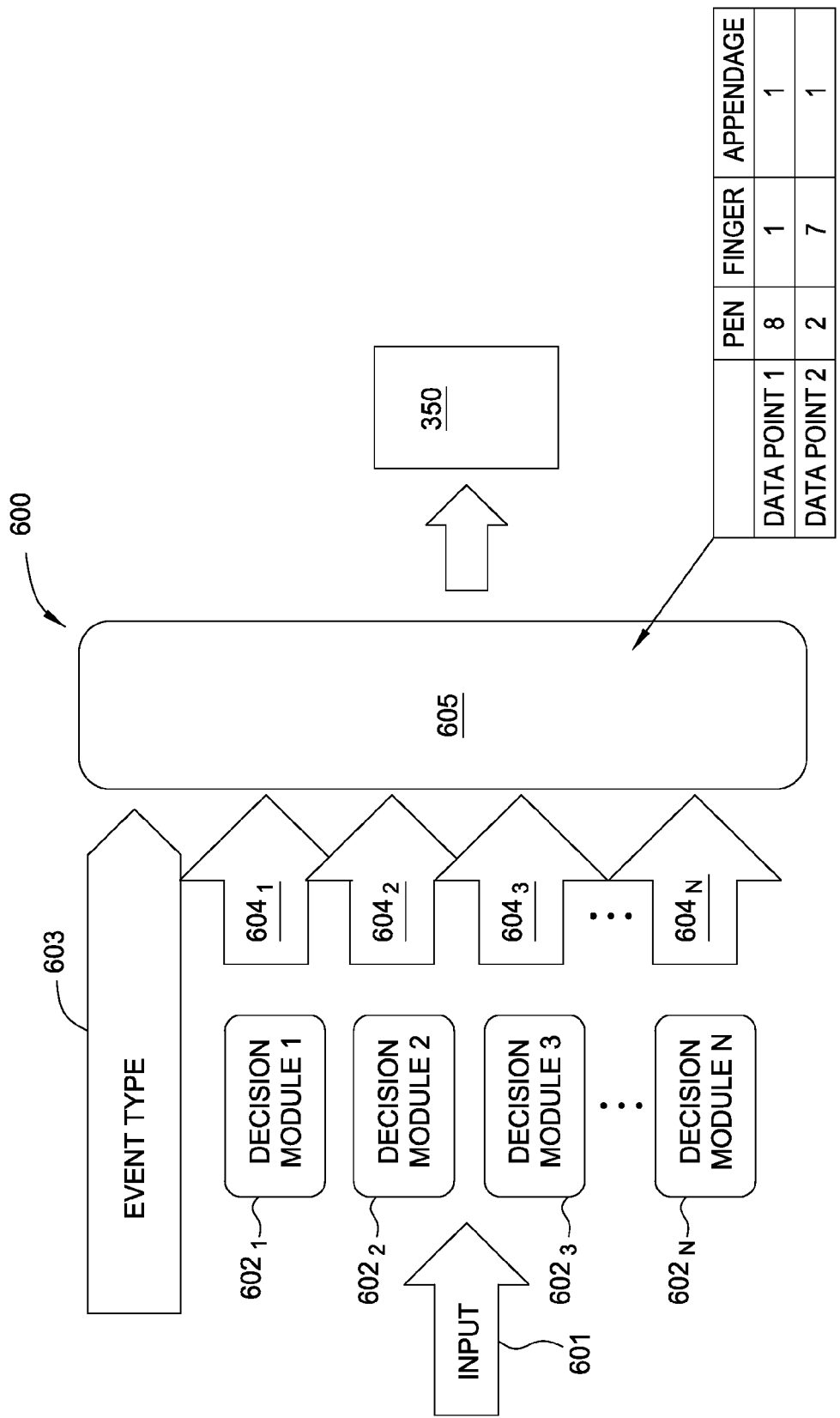
FIG. 6A is a simplified flowchart illustrating a method of discriminating touch interactions from stylus pen interactions on a touch-screen according to an embodiment of the invention.
FIG. 6B is a table listing some examples of some voting results contained in the generated decision matrix data generated during the method of discriminating between various touch interactions illustrated in FIG. 6A, according to one or more of the embodiments described herein.

FIG. 6A illustrates a simplified flowchart of a method 600 of discriminating between different types of user inputs using an inference based discrimination technique. The inference based discrimination technique 343 (FIG. 3A) of the controlling engine 340 takes in the various different types of inputs 601 received by the host device 102 at an instant in time, such as inputs 331, 333, 335, 339 discussed above, and tries to determine what type of user input has been received by comparing the outcome of various analyses performed on the received user input data. The various analyses may be performed by use of two or more decision modules, such as decision modules $602_1$-$602_N$, where N is whole number greater than or equal to two, that each provide an input $604_1$-$604_N$ to a decision matrix 605. The decision matrix 605 then analyzes and compares the received inputs $604_1$-$604_N$ for each touch data point and other event data 603 to determine the most likely element label for each touch data point. The inputs $604_1$-$604_N$ may comprise a "vote" that includes an alphanumeric, numerical or other distinct label that signifies one type of user input from another. In one embodiment, the decision matrix 605 compares the received inputs $604_1$-$604_N$ for each touch data point by tabulating or summing the different votes for the user input type created by each of the decision modules $602_1$-$602_N$. The decision matrix 605 of the controlling engine 340 then generates the output data 350 that is then used by the components and software found in the host device 102. In some embodiments, the decision matrix 605 uses threshold values, which are stored in memory, to assign the user input a desired element label. In one example, a touch data point is not assigned a stylus pen input element label unless it receives a certain minimum number of votes.

In some embodiments, the decision matrix 605 determines an element label for a touch data point by first applying a weighting factor to each of the received inputs $604_1$-$604_N$, and then compares the adjusted, or weighted, inputs to determine the element label for a given touch data point. The weighting factor may mean that a vote provided by a given decision module (e.g., decision module $602_1$) may carry more weight than another vote provided by another given decision module (e.g., decision module $602_2$) based on its ability to correctly characterize the type of user input. In one embodiment, the event type 603 includes other known information relating to the received touch point data, such as whether the data is being delivered from the user interface 104 or stylus pen 106.

In one embodiment, each decision module $602_1$, $602_2$, . . . $602_N$ includes a time based user input discrimination technique, a geometric user input discrimination technique or other applicable user input discriminating rules that is available to the controlling engine 340. In one embodiment, each of the decision modules $602_1$-$602_N$ comprise one or more coded software instructions that apply one or more defined rules that are used to characterize the type user input that a touch data point was derived from. In one example, a decision module $602_1$ characterizes a touch data point based on its relationship to a cluster of other touch data points as discussed in relation to FIG. 5A, a decision module $602_2$ characterizes the touch data point based on its predicted position as discussed in relation to FIG. 5B, a decision module $602_3$ characterizes the touch data point based on its movement being within a threshold value as discussed in relation to FIG. 5C, and a decision module $602_4$ characterizes a touch data point based on the knowledge of an attribute of the user (e.g., right-handed). Then, each decision module $602_1$-$602_4$ delivers its input $604_1$-$604_4$ to the decision matrix 605, or also referred to herein as its "vote" as to what type of user input the touch data point was created from. In one example, the inputs $604_1$-$604_4$ each include whether the decision module believes that it the touch data point is associated with a stylus pen, finger or user's appendage. The decision matrix 605 of the controlling engine 340 then compares the inputs $604_1$-$604_4$ and generates the output data 350 for that touch data point, which may include its position, timestamp information and whether the touch data point is associated with a stylus pen, finger or user's appendage.

FIG. 6B illustrates a table that contains some examples of some voting results contained in the generated decision matrix data based on the received inputs $604_1$-$604_N$, where in this example N is equal to 10. Therefore, the inputs $604_1$-$604_{10}$ (not shown) have been created by use of inputs received from the decision modules $602_1$-$602_{10}$ (not shown), and have been tabulated by the decision matrix 605 to form the illustrated results. In this example, a first touch data point has received eight votes that it is related to a stylus pen, one vote that it is related to a finger and one vote that it is related to a user's appendage, while a second touch data point has received two votes that it is related to a stylus pen, seven votes that it is related to a finger and one vote that it is related to a user's appendage. Therefore, based on the tabulated data the controlling engine 340 would attribute the first touch data point to a stylus pen and the second touch data point to a finger, which would then be delivered in the output data 350.

As noted above, after receiving and analyzing the received user information, the controlling engine 340 may then deliver output data 350 to one or more software and hardware components running on the host device 102. In one example, the output data 350 may be used by one or more third party applications and/or components in the host device 102 to perform some useful display or data output function. In another example, the output data 350 may be used by the host device 102 to generate an image or line on a display in the host device 102, due to the determination that the received touch data is related to a stylus pen 106.

In some cases, after receiving all of the inputs, the decision matrix 605 is unable to determine what type of input a certain touch data point is, which are referred to herein as an "unknown" touch data point. Therefore, to resolve this issue, the software running on the host device may take a few different paths to decide what to do with these unknown touch data points. First, the software may decide not to use the "unknown" touch data points in any of the tasks that is currently performing. For example, in the case of a drawing program, the controlling software may decide not to render the touch point on the screen of the user interface 104. In this case, the controlling software has decided that each data point must have element label to be used. In a second approach, the software running on the host device may decide to use the "unknown" touch data points in the tasks that it is currently performing. For example, in the case of a drawing program, the controlling software may decide to render the touch point on the screen of the user interface 104, and at some later time undo and/or remove the rendered data when it is clear that the input data was not received from a desired component, such as stylus pen or finger. In this case, the controlling software may decide to give each input an initial element label and then correct the label when it has more data.

Figure 7:
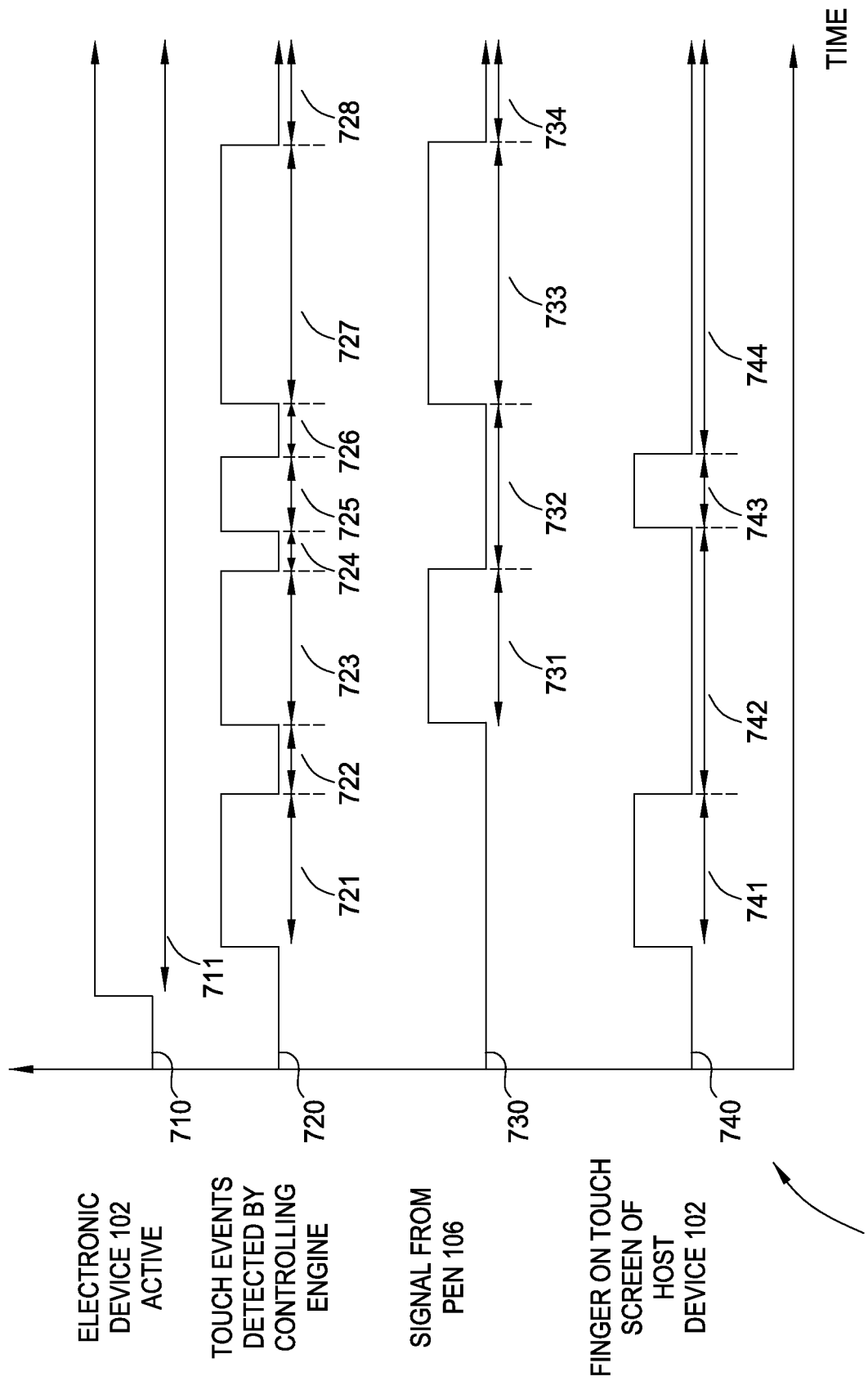
FIG. 7 is a simplified signal diagram illustrating aspects of the process of discriminating stylus pen interactions from touch interactions on a touch-screen, according to an embodiment of the invention.

FIG. 7 is a simplified signal diagram 700 illustrating aspects of a method for discriminating stylus pen interactions from touch interactions on a touch-screen by an inference technique, according to an embodiment of the invention. The diagram includes an host device signal 710, a signal representing touch events detected by a controlling engine 720, a signal representing a touch-down event by a stylus pen 106 on the user interface of the host device 730, and a signal representing a touch interaction (e.g. from a finger of a user) on the user interface of the host device 740.

The host device signal 710 includes an active period 711 that indicates a period where the host device is active and able to receive inputs. The signal representing touch events detected by a controlling engine 720 includes a first period indicating a touch event 721, a first period indicating no touch event 722, a second period indicating a touch event 723, a second period indicating no touch event 724, a third period indicating a touch event 725, a third period indicating no touch event 726, a fourth period indicating a touch event 727, and a fourth period indicating no touch event 728.

The signal representing touch-down event by a stylus pen 106 on the user interface of the host device 730 includes a first period indicating a touch-down event 731, a first period indicating no touch-down interaction 732, a second period indicating a touch-down event 733, and a second period indicating no touch-down interaction 734.

The signal representing a touch interaction on the user interface of the host device 740 includes a first period indicating a touch interaction 741, a first period indicating no touch interaction 742, a second period indicating a touch interaction 743, and a second period indicating no touch interaction 744.

In embodiments of the invention, by correlating the times of the signals from the stylus pen 106 with the times that touch events were detected (e.g. comparing signals 720 and 730 in FIG. 7), the touch-down events attributable to the stylus pen 106 can be parsed out from amongst all the signal periods where touch events were detected. For example, touch events 723 and 727 can be distinguished from touch events 721 and 725 as being touch events conducted using the stylus pen 106 against the user interface 104 of the host device 102, rather being touch events conducted by the user making contact with their finger with the user interface 104 of the host device 102.

Figure 8:
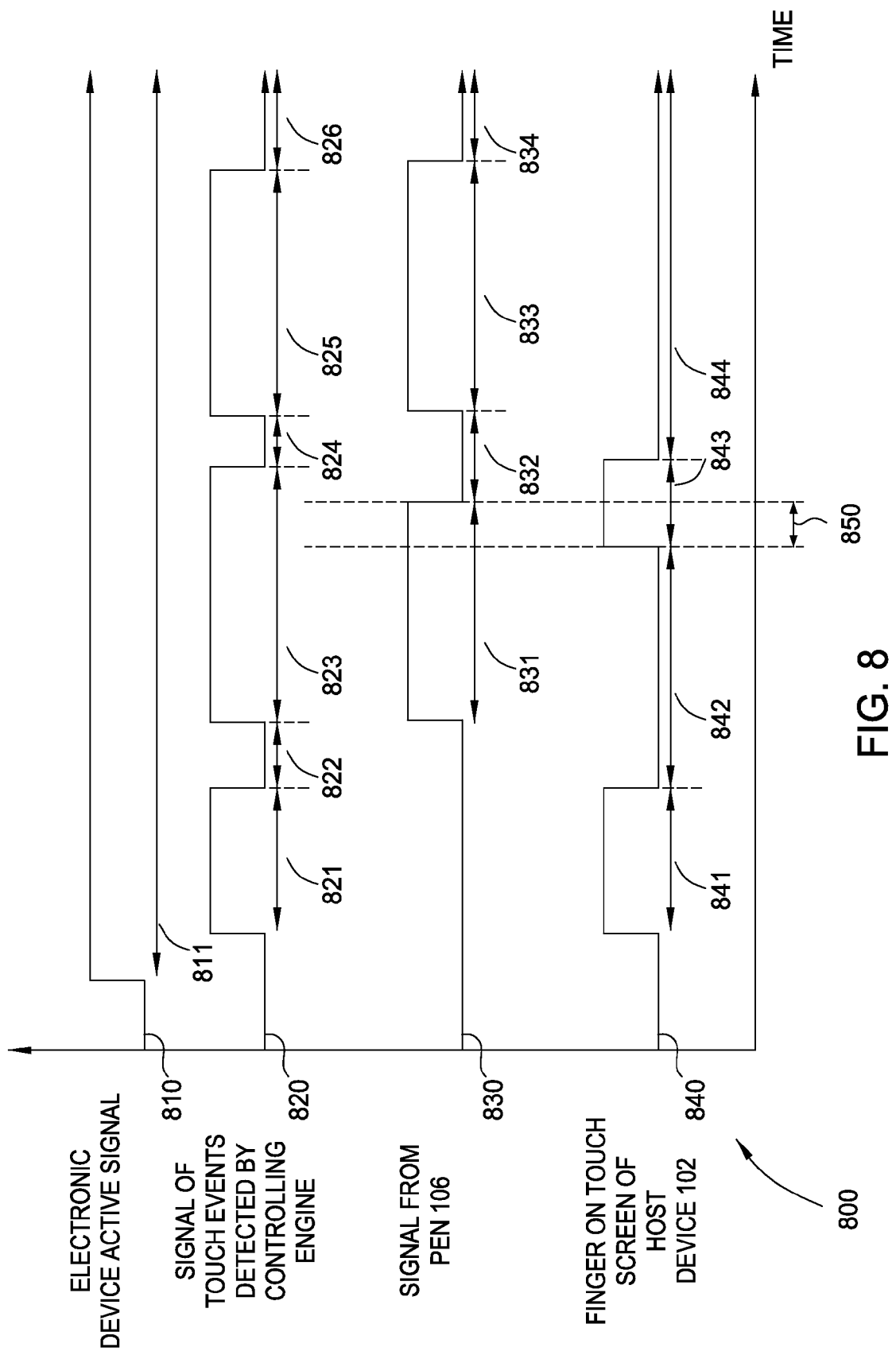
FIG. 8 is a simplified signal diagram illustrating aspects of the process of discriminating stylus pen interactions from touch interactions on a touch-screen, where stylus pen and touch interactions overlap, according to an embodiment of the invention.

FIG. 8 is a simplified signal diagram 800 illustrating aspects of a method for discriminating stylus pen interactions from touch interactions on a touch-screen, where stylus pen and touch interactions overlap, according to an embodiment of the invention. For example, a user may conduct stylus pen and touch interactions simultaneously with the user interface 104 of the host device 102. As there may be periods where the signals overlap, the system can parse out those signals from the stylus pen 106 from the touch interactions conducting using the user's fingers. The diagram includes an host device signal 810, a signal representing touch events detected by a controlling engine 820, a signal representing a touch-down event by a stylus pen 106 on the user interface of the host device 830, and a signal representing a touch interaction (e.g. from a finger of a user) on the user interface of the host device 840.

The host device signal 810 includes an active period 811 that indicates a period where the host device 102 is active and able to receive inputs. The signal representing touch events detected by a controlling engine 820 includes a first period indicating a touch event 821, a first period indicating no touch event 822, a second period indicating a touch event 823, a second period indicating no touch event 824, a third period indicating a touch event 825, and a third period indicating no touch event 826.

The signal representing touch-down events by a stylus pen 106 on the user interface of the host device 830 includes a first period indicating a touch-down event 831, a first period indicating no touch-down interaction 832, a second period indicating a touch-down event 833, and a second period indicating no touch-down interaction 834.

The signal representing a touch interactions on the user interface of the host device 840 includes a first period indicating a touch interaction 841, a first period indicating no touch interaction 842, a second period indicating a touch interaction 843, and a second period indicating no touch interaction 844.

As shown in FIG. 8, the signal representing a touch interaction on the user interface of the host device 840 and the signal representing touch-down events by a capacitive stylus pen on the user interface of the host device 830 partially overlap during an overlap period 850. The overlap period 850 coincides with first period indicating a touch-down event 831 and the second period indicating a touch interaction 843.

As depicted in FIGS. 7 and 8, the signal strength from the touch-down events by the stylus pen 106 and the signal strength from the touch interactions on the user interface of the host device 840 are roughly equal. However, in other embodiments, the relative signal strengths of the touch-down events by the stylus pen 106 and the touch interactions on the user interface of the host device 840 may vary in strength. In these other embodiments, the relative change in signal strengths may be an additional factor in further discriminating between stylus pen and touch interactions.

Active Stylus Pen and Active Pen Control Techniques

Referring back to FIGS. 2 and 3, in one embodiment, the stylus pen 106 may include a touch signal generating device (TSGD) 106h that is used to cause the stylus pen 106 to be selectively sensed by the capacitive sensing elements found within the touch sensing unit 212 of the user interface 104 of the host device 102. In this configuration, touch signal generating device 106h includes one or more components that are able to selectively form a virtual capacitance between a portion of the pen tip 106a and the capacitive sensing elements found in the user interface 104 when a TSGD switch, such as a mechanical sensor/switch 221 is activated by the user. In one example, the TSGD switch is part of the pen tip 106a or pressure sensing unit 106b. The formed virtual capacitance between the pen tip 106a and the host device 102 creates a touch event that is sensed by the user interface 104 with or without the physical act of touching the pen tip 106a to the user interface.

Figure 9A:
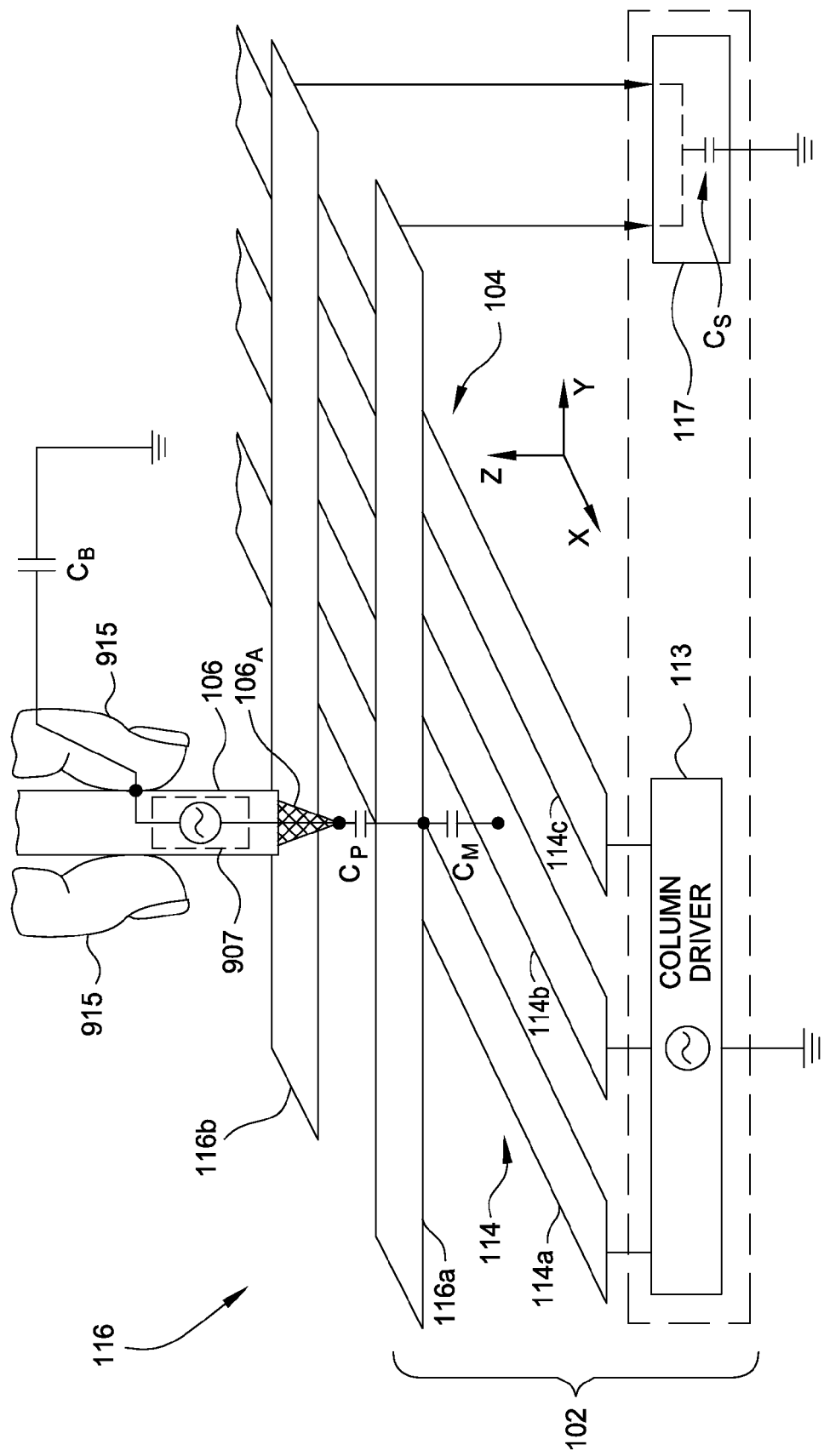
FIG. 9A is an isometric cross-sectional view of a portion of a mutual capacitance sensing type host device that is interacting with an active stylus pen, according to an embodiment of the invention.

FIG. 9A is an electrical schematic that illustrates the operation of an active stylus pen 106 with the host device 102 that is configured for mutual capacitance sensing, according to an embodiment of the invention. The active stylus pen 106 is configured with an active stylus control element 907, which may receive signals from host device 102 as well as generate signals to be transmitted to the host device 102. As shown, the active stylus pen 106 may be held by a user's fingers 915 and is coupled to the user interface 104 through pen tip 106a. The active stylus pen 106 may be physically coupled to the user interface 104, or the active stylus pen 106 may be located in proximity to the user interface 104 such that signals generated within the active stylus control element 907 and transmitted to the pen tip 106a are able to change the sensed capacitance at sensing assembly 117 within the host device 102 to a desired level at a desired time.

The host device 102, of which a portion is depicted in FIG. 9, generally includes a user interface 104, a driver assembly 113 and a sensing assembly 117. The host device 102 may include, for example, drive regions and sense regions, such as drive electrodes 114 and sense electrodes 116. Further, the drive electrodes 114a-114c (x-direction) may be formed in columns while sense electrodes 116a-116b (y-direction) may be formed in rows. Touch sensing areas, or touch pixels, may be formed at the overlapping regions of the drive electrodes and sense electrodes.

During operation, column driver 113 may transmit a capacitive sensing waveform on one or more drive electrodes 114 at a time, thereby creating a mutual capacitance $C_M$ between the row of sense electrodes 116 and the driven drive electrode(s) 114 (i.e., column(s)) at each touch pixel. Active stylus pen 106, when coupled to the user interface 104, may be configured to detect the transmitted capacitive sensing waveform. When active stylus pen 106 is coupled to the user interface 104, some of the charge coupled between the drive electrodes 114 and sense electrodes 116 corresponding to one or more touch pixels may instead be coupled onto the active stylus pen 106, thus forming a pen capacitance $C_P$ corresponding to each of the coupled touch pixels. More charge may generally be coupled from a particular touch pixel to the active stylus pen 106 where the active stylus pen 106 is a shorter distance from that touch pixel; therefore, detecting that more charge has been coupled away from a particular touch pixel may indicate a shorter distance to active stylus pen 106. This reduction in charge coupling across the touch pixels can result in a net decrease in the measured mutual capacitance CM between the drive electrode 114 and the sense electrode 116, and a reduction in the capacitive sensing waveform being coupled across the touch pixel. This reduction in the charge-coupled sensing waveform can be detected and measured by analyzing the change in the sensed capacitance $C_s$ in the sensing assembly 117 to determine the positions of multiple objects when they touch the user interface 104.

In some embodiments, the active stylus pen 106 may send a controlling signal to the user interface 104 by injecting a charge at the appropriate time to the pen tip 106a, which alters the mutual capacitance $C_M$ and thus the value of sensed capacitance $C_s$ detected by the sensing assembly 117. Therefore, by controlling the amount of charge to a desired level, or voltage formed between the pen tip 106a and a sensing electrode 116 to a desired level, the pen tip 106a of the active stylus pen 106 can be detected by the capacitive sensing element in the touch-screen containing device as being a touch event.

Further, in some embodiments the active stylus pen 106 may detect a signal produced at one or more drive electrodes 114 of the touch-screen containing device by the column driver 113. Based on the detected signal, the active stylus pen 106 may alter the sensed capacitance $C_s$ to a level at a desired time, so as to cause the touch-screen containing device to correctly determine the location of input provided by the active stylus pen 106. Advantageously, since the size of the pen tip 106a is generally too small to be sensed by the user interface 104, the active stylus pen 106 may therefore be used to selectively provide a touch sensing input to the user interface 104. Therefore, by timing when a user input is provided by the active stylus pen 106 to the user interface 104, the software running on the touch-screen containing device can analyze and use the provided input to control some aspect of a software program running on the touch-screen containing device and/or display some aspect of the input received on the display portion of the touch-screen device. In some embodiments, the active stylus pen 106 is adapted to deliver input from the active stylus pen 106 to any type of touch-screen containing device, despite differences in the particular configurations and sensing methods preformed by the touch-screen containing devices.

Figure 9B:
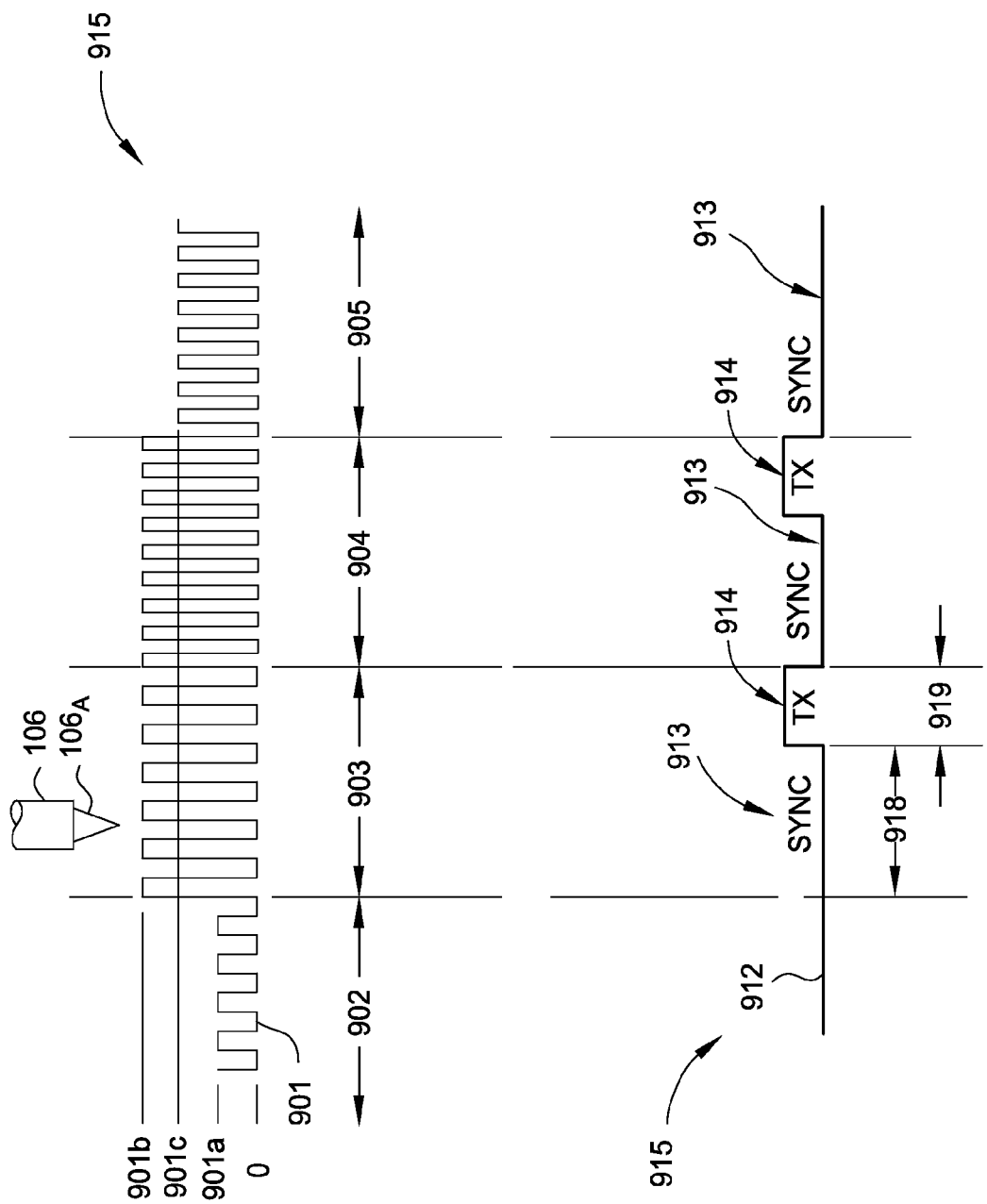
FIG. 9B is a schematic signal diagram illustrating aspects of the process of detecting a touch-sensing device output signal and synchronizing an active stylus pen thereto, according to an embodiment of the invention.

FIG. 9B generally illustrates a driven touch-sensing detected signal 951 provided by the touch sensing components in the host device 102 and a controlling signal 915 that is generated and provided to the pen tip 106a by the active stylus controlling element 907, according to an embodiment described herein. To provide desirable user input the active stylus control element 907 may generally operate in a synchronization mode 913 or in a transmit mode 914.

For example, assume that active stylus pen 106 is coupled to a particular touch-screen containing host device 102. The location of the pen tip 106a on the touch screen may be directly at a drive pixel that contains a portion of the drive electrode 114 (i.e., a column) and the sense electrode 116 (i.e., a row), but may also be located on the touch screen between drive pixels. Detected signal 951 represents the voltage measured by the pen tip 106a over time. Detected signal 951 reflects a signal that is generated by the column driver 113 and then sequentially applied to each column as the user interface 104 is sequentially scanned. The active stylus controlling element 907 may operate by default in synchronization mode 913, essentially listening for signal activity in this mode, then may transition to transmit mode 914 based on signal activity received and processed by the processor 106c.

During time period 902, detected signal 901 has a signal magnitude 901a, which indicates that the column driver 113 signal is being applied to a column that is a distance away from the pen tip 106a, such as a neighboring column, and thus has not yet reached the column nearest to the pen tip 106*a*. The active stylus control element 907 may remain in a synchronization mode 913 for a period of time or until the signal magnitude changes. During the next time periods 903 and 904, detected signal 901 has an amplitude of 901*b*, indicating that the column driver 113 is currently applying a portion of the detected signal 901 to a column (e.g., drive electrode 114) that is closer to the pen tip 106*a* than the column that delivered the signal during the time period 902.

Generally, synchronization of the active stylus control element 907 with the touch-screen containing host device 102 is important to ensuring accurate input is detected by the host device 102. For example, suppose the active stylus control element 907 transmits a signal to pen tip 106*a* when column driver 113 is driving a column at which the pen tip 106*a* is not located. The signal transmitted to pen tip 106*a* will change the sensed capacitance most strongly at a sensing assembly 117 closest to the location of pen tip 106*a*, but may also affect nearby sensing assemblies 117 to a lesser degree. Because the host device 102 may measure the values of sensed capacitance across all rows simultaneously, but the columns are driven in particular sequence, the host device 102 will detect the changes in sensed capacitance but may misinterpret the location of the input. The effect of the misinterpretation may be erratic or erroneous input into host device 102, which may cause the input position on the screen to jump around and/or lead to other undesirable effects in programs being executed on host device 102, and may further significantly degrade the user's experience.

At the next time period 904, the frequency of detected signal 901 received from the host device 102 may be changed, and may be a higher or lower frequency than the portion of the detected signal 901 in time period 903. The change in frequency may be caused by the particular scanning process of host device 102. In this example, the frequency of detected signal 901 increases at time period 304 while the amplitude of detected signal 901 remains at a signal magnitude 901*b*, indicating that the detected signal 901 is still being applied to the same or similarly positioned column to pen tip 106*a*. In one or more configurations, the active stylus control element 907 may adapt to such a change in frequency and adjust the output signal delivered from the pen tip 106*a*. To accomplish this, the active stylus control element 907 may stop transmitting and transition from transmit mode 914 to synchronization mode 913. When the active stylus control element 907 regains synchronization with detected signal 901, the active stylus control element 907 may then return to transmit mode 914 and resume transmitting an output signal 912 to the pen tip 106*a*.

At subsequent time period 905, the magnitude of detected signal 901 decreases from 901*b* to 901*c*, indicating that the column driver 113 is applying the detected signal 901 to a column (i.e., the column driver 113 is transmitting on the next column) that is a further distance away from the column(s) that delivered the signal during the time periods 903 and 904. The indication that the nearest column is no longer delivering the detected signal 901 from column driver 113, which then causes the active stylus control element 907 to transition into synchronization mode 913, irrespective of the frequency or phase of detected signal 901 that is detected by the active stylus pen 106. Although signal 901 is depicted as having the same frequency and phase during time period 305 as during time period 904, the example is meant to demonstrate that the signal magnitude falling below a particular threshold may trigger a transition into synchronization mode 913, regardless of signal frequency or phase. Further, the examples disclosed herein are not meant to be limiting the claimed subject matter to only those embodiments interacting with host devices 102 that generate such signal patterns, frequencies, phases, or changes in frequencies and/or phases.

In one or more embodiments, the maximum signal magnitude value that corresponds to column driver 113 driving the nearest column (i.e., magnitude 901*b*) may be learned during one scan cycle. The maximum signal magnitude value may then be used to determine a threshold value that can effectively distinguish the maximum magnitude value from the remainder of detected signal magnitude values (i.e., distinguish magnitude 901*b* from magnitudes 901*a* and 901*c*). In subsequent scan cycles, the threshold value may be compared with the detected signal magnitude to indicate whether column driver 113 is currently driving the nearest column to pen tip 106*a*.

In one embodiment, when the sensing component (e.g., communications unit 906*d*, the processor 906*c* and the memory 906*e*) of the active stylus pen 106 determines that the nearest column(s) are delivering the column driver 113 signal, the sensing component may analyze the detected signal 901 and generate an output signal based on the detected signal 901. The active stylus control element 907 may remain in synchronization mode 913 for a time period 918, when analysis of the detected signal 901 is complete and the active stylus control element 907 has synchronized to the detected signal 901. The active stylus control element 907 may then transition into transmit mode 914 and begin transmitting an output signal, such as the output signal found in transmit modes 914 of the controlling signal 915 to the pen tip 106*a*. Transmission may continue until synchronization with the detected signal 901 is lost (e.g., if the frequency or phase of detected signal 901 changes).

Though active stylus control element 907 may be capable of on-the-fly adaption to a frequency change in a detected signal 901, this adaptive capability may have a significant computational expense. This expense may have secondary effects of increasing the power consumption of active stylus pen 106 as the active stylus control element 907 more frequently processes the detected signal 901 and attempts to synchronize, as well as decreasing the percentage of time during scan cycles that the active stylus control element 907 is able to transmit to host device 102. For example, active stylus control element 907 is depicted as being in synchronization mode 913 for a longer period 918 than the period 919, during which active stylus control element 907 is in transmit mode 914. Such a decreased percentage may result in a less responsive input to the host device 102, which may ultimately cause computing errors in host device 102.

In another embodiment, however, the active stylus pen 106 may accommodate longer transmit mode periods 919 by storing host device identification information that relates to one or more host devices 102. The information may include data relating to physical characteristics or capacitive sensing techniques of each of the different types of host devices, and the information may be stored in memory 106*e*. The host device identification information may further include frequency, timing and phase information of detected signal 901, number of rows and/or columns in the user interface 104 and other useful information. The host device identification information may be pre-programmed and/or stored in memory based on vendor specifications or may be learned (through use of the active stylus pen 106 with particular host devices 102) and then stored in memory by the sensing component of active stylus pen 106. If the active stylus pen 106 already contains host device identification information corresponding to the particular host device 102, the active stylus pen 106 may advantageously bypass synchronization mode 913 when column driver 113 is driving detected signal 901 on the nearest column. In other words, active stylus pen 106 may transmit an output signal to the pen tip 106a during the entirety of the time period. Further, frequency and phase changes to detected signal 901 may not disrupt the transmission by the active stylus pen 106 if the target frequency and phase values are also included in the host device identification information.

In one embodiment, the stylus pen 106 is able to use the knowledge of the physical characteristics of the host device 102 to determine one of the coordinates of a touch event created by a stylus pen 106's interaction with the user interface 104. In one example, since the stylus pen is able to sense the transmitted signals provided by the driven columns in the host device 102, and is able to determine that it is nearer to one column versus another, using of the knowledge of the physical layout of the columns (i.e., driven electrodes) in the host device 102, the stylus pen 106 can ascertain its x-direction coordinates. By monitoring the full touch sensing scan cycle, or monitoring characteristics of the touch sensing scanning process performed by the host device 102, the stylus pen 106 can determine which column number is being driven at a certain time, either by knowledge of the scanning technique used by the host device and/or by analysis of the touch sensing scanning process. For example, it is common for touch sensing devices to drive all of the columns at the end of a touch sensing cycle to reduce any charge built up in different areas of the user interface. The stylus pen 106 is then able to detect and use this information to know when the first column in a new touch sensing scan is about to start. The stylus pen can then analyze the number of sensing signals of different amplitude created by the column driver 113 that are sent before the column nearest the pen tip 106a is reached. The stylus pen 106 can then determine which column number that it is nearest to in the user interface, and thus its relative x-coordinate position. The x-coordinate position can then be transmitted to the host device via the communication link 205, so that this information can be used by and/or compared with the touch sensing coordinate information received from the host device to help more easily determine which touch data points are related to the stylus pen 106. Knowledge of at least one of the coordinates of a stylus pen 106 interaction with the user interface 104 can help reduce misidentification error rate and help with palm and finger detection using the techniques described above.

Figure 9C:
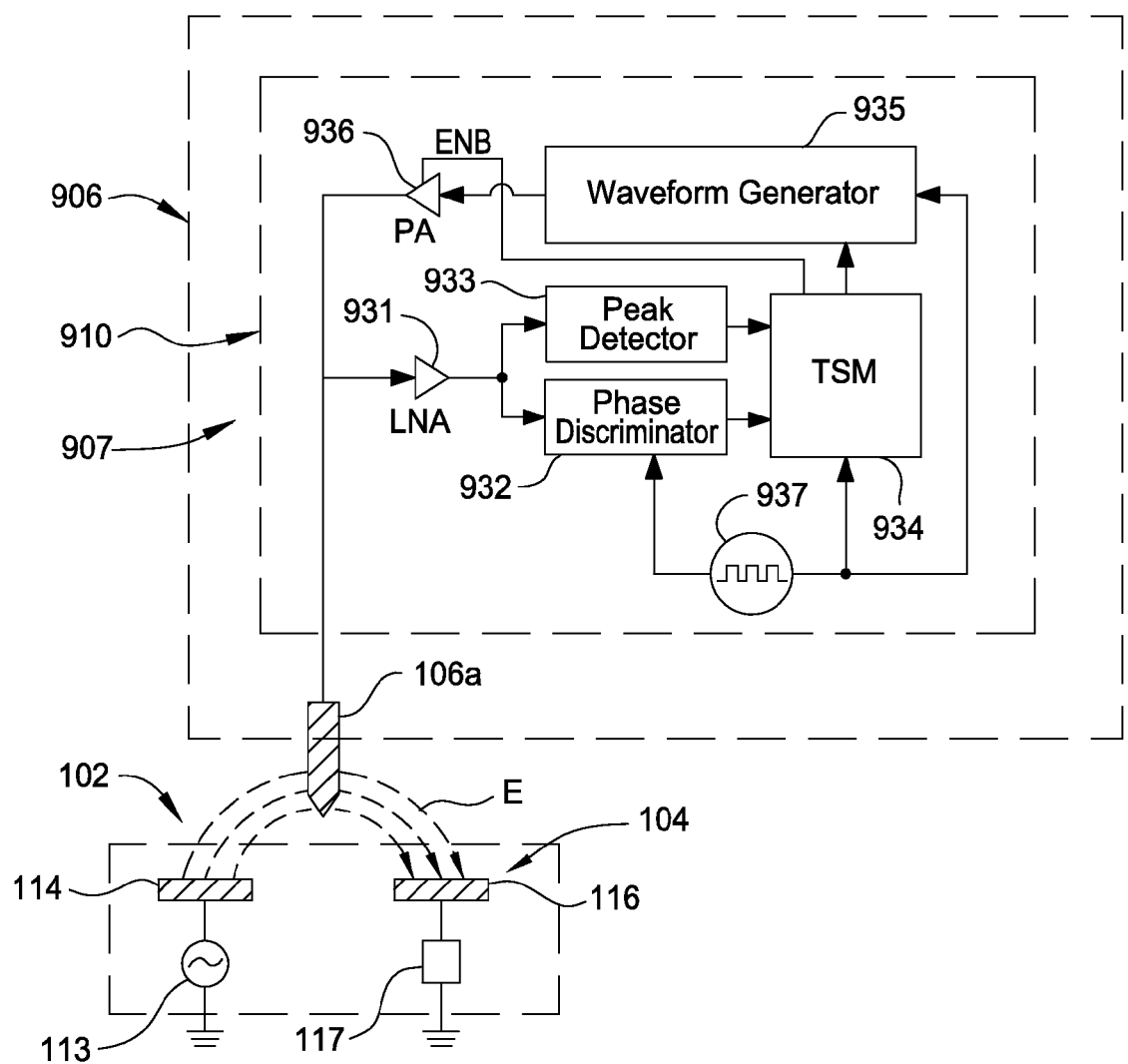
FIG. 9C illustrates the components of an active stylus pen 206 capable of interacting with a host device 100 that is configured for mutual capacitance sensing, according to an embodiment of the invention.

FIG. 9C illustrates the components of an active stylus pen 106 capable of interacting with a host device 102 that is configured for mutual capacitance sensing, according to an embodiment of the invention. The active stylus pen 106 may couple to the host device 102 through pen tip 106a, as discussed above. The active stylus pen 106 is further configured with an active stylus control element 910, which comprises a low-noise amplifier (LNA) 931, a phase discriminator 932, a peak detector 933, a timing state machine (TSM) 934, a waveform generator (WG) 935, a power amplifier (PA) 936, and a clock source 937. The LNA 931 generally provides linear signal amplification, and in one or more configurations, LNA 931 may operate across the 10 kilohertz (kHz) to 1 megahertz (MHz) frequency range and may have an input impedance is greater than 1 megaohm (MΩ). The phase discriminator 932 is generally a zero-crossing detector, which generates a pulse having a width of one cycle of clock source 937 upon detecting a transition of potential at pen tip 106a. The peak detector 933 is generally comprised of rectifier, integrator, and high pass filter components. The TSM 934 is comprised of a state machine that controls mode selection, a phase and frequency estimator, a calibration state machine, and a timing sequencer through use of the processor 106c, clock 106g and memory unit 106e. Output generated by TSM 934 provides control to the WG 935, which may generate an appropriate sequence of square pulses having a particular frequency, amplitude and duty cycle that are specified by TSM 934. The PA 936 drives the pen tip 106a so that a desired signal can be detected by the host device 102, and is capable of tri-state operation based on control signals received from TSM 934 and WG 935. In one example, the tri-state operation, which may be controlled by the TSM 934, may include the delivery of a high voltage signal ($V_H$) (e.g., positive voltage signal) and a low voltage signal ($V_L$) (e.g., negative voltage signal) to provide a desired signal from the pen tip 106a that can be sensed (e.g., $V_H$ or $V_L$) at desired times by any type of host device 102 using any type sensing technique. The PA 936 may also deliver no signal at all to pen tip 106a such as during idle periods or while the PA 936 is in a high-impedance mode (e.g., when active stylus control element 910 is synchronizing to a detected signal 901). The clock source 937 may be a crystal oscillator or a comparably precise source, and is typically the same clock as clock 206g discussed above. The clock source 937 is generally required to be as precise as the clock source that drives the user interface 104. The host device 102 generally includes a user interface 104, a driver assembly 113 and a sensing assembly 117. Touch sensing areas, or touch pixels, may be formed at the overlapping regions of the one or more drive electrodes 114 and one or more sense electrodes 116. As shown, pen tip 106a is located within an electric field E of the mutual capacitance created by the drive electrode 114 and sense electrode 116. In this configuration, the pen tip 106a is coupled to the user interface 104, and the signals generated within the active stylus control element 910 and transmitted to the pen tip 106a may alter the electric field E, which in turn may change the sensed capacitance at sensing assembly 117 to a desired level at a desired time.

According to an embodiment of the invention, active stylus control element 910 may generally operate in a synchronization mode and/or in a transmit mode. The active stylus control element 910 may operate by default in synchronization mode, essentially listening for signal activity of the touch sensing component in the host device 102 in this mode, then may transition to transmit mode based on received signal activity. To operate in synchronization mode, the TSM 934 may transmit an output to the enable (ENB) input of PA 936, which causes the PA 936 to operate in a high impedance mode and deliver the signal to the pen tip 106a at a desired time to coincide with the capacitive sensing signal delivered by the host device 102. The high impedance at PA 936 relative to LNA 931 causes most of the detected signal at pen tip 106a to be transmitted to the LNA 931. The TSM 934 also may transmit an output to the WG 935 to disable the WG 935, which may be advantageously used to conserve power in the active stylus pen 106. In some configurations, the pen tip 106a when coupled to a host device 102 may detect a signal from the host device 102, by monitoring the signal received by the LNA 931 as PA 936 is operating in high impedance mode. After being amplified at LNA 931, the detected signal is provided to both the phase discriminator 932 and the peak detector 933. The respective outputs from the phase discriminator 932 and peak detector 933 are then transmitted to TSM 934, which uses the estimated phase and frequency to control the output of the WG 935.

Upon determining the estimated phase and frequency of the signal received from the host device 102, the TSM 934 may cause the active stylus control element 910 to operate in transmit mode by enabling the PA 936 and causing the WG 935 to begin generating an output signal according to the phase, amplitude and frequency information provided by the TSM 934. The output signal generated by the WG 935 may next be amplified by the PA 936. In one or more embodiments, LNA 931 may have a relatively large input impedance compared to the pen tip 106*a*, so that the amplified signal will be transmitted to the pen tip 106*a*, in order to affect the sensed capacitance due to the capacitive coupling of the pen tip 106*a* to the touch sensing components in the user interface 104.

In one embodiment, the touch signal generating device 106*h* includes signal control electronics 106*i*, a conductive coating 222 formed on a surface of the stylus pen 106, which the user is in contact with when they are holding the stylus pen 106, and the mechanical sensor/switch 221 (e.g., simple mechanical switch). In one embodiment, the signal control electronics 106*i* generally includes a signal generating device and other supporting components that are able to inject a current through the pen tip 106*a* to the capacitive sensing elements in the user interface 104 at an interval that is synchronized with the capacitive sensing signals delivered between the capacitive sensing elements in the user interface 104. The signal control electronics 106*i* is also adapted to detect the capacitive sensing signal(s) delivered between the transmitter and receiver electrodes in the touch sensing unit 212 at any instant in time, and a phase shifting device (not shown) that is able to synchronize the timing of the injection of current through the pen tip 106*a* with the delivery of the capacitive sensing signal(s) delivered between the transmitter and receiver electrodes. The mechanical sensor/switch 221 when activated electrically couples the conductive coating 222, signal control electronics 106*i* and other useful electrical components in the stylus pen 106 to the pen tip 106*a* to create a virtual capacitance signal that is delivered between then pen tip 106*a* and the capacitive sensing elements in the user interface 104. The virtual capacitance created by the activation of the mechanical sensor/switch 221 can at least be intermittently formed between the pen tip 106*a* and a portion of the user interface 104, so that a desirable touch signal is received by the user interface 104 with or without the physical act of touching the pen tip 106*a* to the user interface.

In one embodiment, the initial activation of the mechanical sensor/switch 221 causes a specific set of sensing signal pulses, or signature pulses, that will allow the one or more input discrimination techniques 345 used by the controlling engine 340 to more easily determine that the created touch data input created by the activation of the touch signal generating device 106*h* will be more easily characterized as an input from the stylus pen 106. One will note that the capacitive sensing elements in the user interface 104 of the host device 102 are sampled a set frequency (e.g., sampled every 16 ms). Therefore, the set of sensing signal pulses created by portions of the stylus pen 106 (e.g., touch signal generating device 106*h*, processor 106*c* and memory 106*e*) when the touch signal generating device 106*h* is activated may require two or more sensing signal pulses that each have a distinguishing preset length and/or fixed time between them that is equal to greater than the sampling rate of the device, so that the signature of the activation of the touch signal generating device 106*h* can be more easily determined by the user input discriminating techniques performed by the controlling engine 340 that is running on the host device 102. Thus, the touch signal generating device 106*h* is useful, since it allows the user to initiate the interaction of the stylus pen 106 with the user interface 104, rather than wait for the sensed contact of the pen tip 106*a* and the user interface 104 to be characterized by the controlling engine 340 as an input is received from a stylus pen.

Use of the touch signal generating device 106*h* can also allow two or more pens 106 to be used with a host device 102, since each stylus pen can provide a different initial signature pulse configurations that allow the controlling engine 340 to determine which of the pens 106 is being used at any instant in time. FIG. 10 illustrates two sets of signature pulses 1001 and 1002 that each may be delivered from two different pens 106, so that the controlling engine 340 can more easily determine that the user input created by each stylus pen 106 will be more easily associated to that particular stylus pen. The signature pulses 1001 and 1002 may be generated at the start of the interaction of the stylus pen with the user interface 104 to let the controlling engine know that the subsequent touch interactions that are associated with that initiating touch event will be made by a particular stylus pen. As illustrated in FIG. 10, the signature pulse 1001 may comprise two pulses 1005 and 1006 that each have a desired duration 1021 and 1023, respectively, and an off-period 1007 that has a duration 1022. Also, the signature pulse 1002 may comprises two pulses 1010 and 1011 that each have a desired duration 1041 and 1043, respectively, and an off-period 1012 that has a duration 1042. Therefore, due to at least one difference between signature pulses 1001 and 1002, such as the number of pulses (e.g., 2, 4 or 8 pulses), pulse shape (e.g., square-wave shape, sinusoidal wave shape), pulse duration or off-period between pulses the controlling engine 340 will be able to more easily determine that a particular input is received by one stylus pen versus another. Moreover, a signature pulse 1001 or 1002 can also be used to determine that an interaction sensed by the user interface 104 is related to a stylus pen and not a finger or user's appendage.

While the techniques disclosed herein primarily discuss a process of determining the type of user input to create output data that is used within a host device on which the controlling engine is running, this configuration is not intended to limiting as to the scope of the invention described herein, since the output data can also be delivered to or shared with other peripheral devices without deviating from the basic scope of the invention described herein.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teaching provided herein, a person of ordinary skill in the art will appreciate other ways and/or methods to implement the present invention.

In embodiments, any of the entities described herein may be embodied by a computer that performs any or all of the functions and steps disclosed.

It should be noted that any recitation of "a", "an" or "the" is intended to mean "one or more" unless specifically indicated to the contrary.

It is also understood that the examples and embodiments described herein are for illustrative purposes only and that various modifications or changes in light thereof will be suggested to persons skilled in the art and are to be included within the spirit and purview of this application and scope of the appended claims. Therefore, the above description should not be understood as limiting the scope of the invention as defined by the claims.

The invention claimed is:

1. A method of using a touch sensitive computing device including a user interface coupled to a touch sensing unit capable of detecting input received on the user interface, the method comprising:

receiving, at the computing device, information related to a plurality of touch data points that are detected during a first touch event on the user interface, wherein the received information from the first touch event comprises position and time information relating to the plurality of touch data points;

generating a first type of user input vote for a first touch data point of the plurality of touch data points based on a comparison of a first set of data consisting of one or more of position and time information from the received information and configurational information with a first rule, wherein the first set of data includes at least one of position or time information from the received information; and the configurational information consists of configurational settings selected from the group of information about a user, a handheld device, and the touch sensitive computing device;

generating a second type of user input vote for the first touch data point based on a comparison of a second set of data consisting of one or more of position and time information from the received information and the configurational information with a second rule, wherein the second set of data includes at least one of position or time information from the received information; and generating output data that comprises a label attributed to a source of user input assigned to the first touch data point, wherein assigning the label to the source of user input to the first touch data point includes analyzing the first type of user input vote and the second type of user input vote.

2. The method of claim 1, wherein generating output data further comprises:

applying a first weighting factor to the first type of user input vote;

applying a second weighting factor to the second type of user input vote; and the analyzing the first type of user input vote and the second type of user input vote further comprises analyzing the weighted first type of user input vote and the weighted second type of user input vote, wherein the first weighting factor and the second weighting factor are not equal.

3. The method of claim 1, further comprising: altering information rendered on the user interface at a position relating to the first touch data point based at least partially on information found in the generated output data.

4. The method of claim 1, wherein the source of user input includes an input selected from the group consisting of a finger, an appendage, or a stylus pen.

5. The method of claim 1, further comprising generating an image on the user interface relating to the first touch data point when the assigned label to the source of user input to the first touch data point is a stylus pen.

6. The method of claim 1, wherein the first set of data includes configurational information relating to a user that is stored in a memory of the computing device.

7. The method of claim 1, wherein generating the first type of user input vote comprises:

defining a boundary that encloses a region of an input surface of the user interface, wherein the position of the plurality of touch data points on the input surface of the user interface are disposed within the boundary, and then generating the first type of user input vote by comparing the position of the first touch data point relative to a portion of the boundary.

8. The method of claim 1, further comprising:

receiving, at the computing device, information related to a second touch event and a third touch event from the touch sensing unit coupled to the computing device, wherein the information from the second touch event comprises a second touch data point and the information from the third touch event comprises a third touch data point;

generating a third type of user input vote by comparing the second touch event with the first rule and generating a fourth type of user input vote by comparing the second touch event with the second rule;

attributing the second touch data point to a source of user input by analyzing the generated third and fourth type of user input votes, wherein the source of user input attributed to the first and second touch data points are the same;

defining a region of a surface of the user interface of the computing device that includes the first and second touch data points;

determining that the third touch data point is positioned within the region of the user interface; and attributing the third touch data point to the same source of user input as the first and second touch data point due to its position within the region of the surface of the user interface.

9. The method of claim 8, wherein the information related to the first, second and third touch events each essentially comprise information relating to a time when the corresponding touch event occurred and a position of the one or more touch data points detected during the corresponding touch event.

10. The method of claim 1, wherein attributing the first touch data point to the source of user input comprises using a controlling engine running on the computing device.

11. The method of claim 1, wherein the received information from the first touch event includes a portion of information received through a communication link at the computing device from an active stylus pen, wherein the portion of information from the active stylus pen includes information related to a position of a tip of the active stylus pen relative to an electrode disposed in the touch sensing unit coupled to the computing device.

12. The method of claim 11, wherein the position of the active stylus pen is determined by the active stylus pen and at least partially from a capacitive sensing signal delivered from the electrode.

13. The method of claim 1, wherein the first set of data and the second set of data consist of position and time information from the received information.

14. A non-transitory computer-readable medium disposed in a computing device capable of detecting user input received by a user interface of the computing device, the non-transitory computer-readable medium containing a set of instructions that causes a processor to perform a process comprising:

receiving information related to a plurality of touch data points that are detected during a first touch event on the user interface, wherein the received information from the first touch event comprises position and time information relating to the plurality of touch data points;

generating a first type of user input vote for a first touch data point of the plurality of touch data points based on a comparison of a first set of data consisting of one or more of position and time information from the received information and configurational information with a first rule, wherein the first set of data includes at least one of position or time information from the received information; and the configurational information consists of configurational settings selected from the group of information about a user, a handheld device, and the touch sensitive computing device;

generating a second type of user input vote for the first touch data point based on a comparison of a second set of data consisting of one or more of position and time information from the received information and the configurational information with a second rule, wherein the second set of data includes at least one of position or time information from the received information;

attributing the first touch data point to a source of user input by analyzing the first type of user input vote and the second type of user input vote; and altering information rendered on the user interface at a position relating to the first touch data point based on the attributed source of user input.

15. The non-transitory computer-readable medium as recited in claim 14, wherein the instructions executed by the processor further cause the processor to:

apply a first weighting factor to the first type of user input vote to form a weighted first type of user input vote;

apply a second weighting factor to the second type of user input vote to form a weighted second type of user input vote; and the analyzing the first type of user input vote and the second type of user input vote further comprises analyzing the weighted first type of user input vote and the weighted second type of user input vote, wherein the first weighting factor and the second weighting factor are not equal.

16. The non-transitory computer-readable medium as recited in claim 14, wherein the instructions executed by the processor further cause the processor to:

alter information rendered on the user interface at a position relating to the first touch data point based at least partially on the source of user input attributed to the first touch data point.

17. The non-transitory computer-readable medium as recited in claim 14, wherein the instructions executed by the processor further cause the processor to:

generate an image on the user interface relating to the first touch data point when the assigned source of user input to the first touch data point is a stylus pen.

18. The non-transitory computer-readable medium as recited in claim 14, wherein the instructions executed by the processor further cause the processor to:

receive information related to a second touch event and a third touch event from the touch sensing unit coupled to the computing device, wherein the information from the second touch event comprises a second touch data point and the information from the third touch event comprises a third touch data point;

generate a third type of user input vote by comparing the second touch event with the first rule and generating a fourth type of user input vote by comparing the second touch event with the second rule;

attribute the second touch data point to a source of user input by analyzing the generated third and fourth type of user input votes, wherein the source of user input attributed to the first and second touch data points are the same;

define a region of a surface of the user interface of the computing device that includes the first and second touch data points;

determine that the third touch data point is positioned within the region of the user interface; and attribute the third touch data point to the same source of user input as the first and second touch data point due to its position within the region of the surface of the user interface.

19. The non-transitory computer-readable medium as recited in claim 14, wherein the received information from the first touch event includes a portion of information received through a communication link from an active stylus pen, wherein the portion of information from the active stylus pen includes information related to a position of a tip of the active stylus pen relative to an electrode disposed in the touch sensing unit coupled to the computing device.

20. The non-transitory computer-readable medium as recited in claim 19, wherein the position of the active stylus pen is determined by the active stylus pen at least partially from a capacitive sensing signal delivered from the electrode.

21. The non-transitory computer-readable medium as recited in claim 14, wherein generating the first type of user input vote comprises:

defining a boundary that encloses a region of an input surface of the user interface, wherein the position of the plurality of touch data points on the input surface of the user interface are disposed within the boundary, and then generating the first type of user input vote by comparing the position of the first touch data point relative to a portion of the boundary.

* * * * *